United States Patent
Banipal et al.

(10) Patent No.: US 12,141,212 B2
(45) Date of Patent: Nov. 12, 2024

(54) INTELLIGENT INTERFACE ACCELERATING

(71) Applicant: INTERNATIONAL BUSINESS MACHINES CORPORATION, Armonk, NY (US)

(72) Inventors: Indervir Singh Banipal, Austin, TX (US); Shikhar Kwatra, Durham, NC (US); Raghuveer Prasad Nagar, Kota (IN); Jeremy R. Fox, Georgetown, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 86 days.

(21) Appl. No.: 16/802,314

(22) Filed: Feb. 26, 2020

(65) Prior Publication Data
US 2021/0263978 A1    Aug. 26, 2021

(51) Int. Cl.
*G06F 16/95* (2019.01)
*G06F 16/951* (2019.01)
*G06N 20/00* (2019.01)

(52) U.S. Cl.
CPC ........... *G06F 16/951* (2019.01); *G06N 20/00* (2019.01)

(58) Field of Classification Search
CPC .................................................. G06F 16/951
USPC ........................................................ 707/709
See application file for complete search history.

(56) References Cited

U.S. PATENT DOCUMENTS

| | | | |
|---|---|---|---|
| 6,954,732 B1 | 10/2005 | DeLapa et al. | |
| 7,013,286 B1 | 3/2006 | Aggarwahl | |
| 7,133,848 B2 | 11/2006 | Phillips et al. | |
| 7,231,357 B1 | 6/2007 | Shanman et al. | |
| 9,760,854 B1 * | 9/2017 | Chowdhary | G06Q 10/0838 |

(Continued)

OTHER PUBLICATIONS

Mell, Peter, et al., "The NIST Definition of Cloud Computing", NIST Special Publication 800-145, Sep. 2011, Gaithersburg, MD, 7 pgs.

(Continued)

*Primary Examiner* — Syling Yen
(74) *Attorney, Agent, or Firm* — Elliot J. Shine, Esq.; HESLIN, ROTHENBERG, FARLEY & MESITI, P.C.; George S. Blasiak, Esq.

(57) ABSTRACT

Methods, computer program products, and systems are presented. The method computer program products, and systems can include, for instance: obtaining user browsing data from a browser plugin of a client computer device, the client computing device being associated to the user; examining the user browsing data; classifying a current activity of the user in dependence on the examining the user browsing data, wherein the classifying includes classifying the current activity of the user as searching for a service provider; in response to classifying the current activity of the user as searching for a service provider, performing web crawling on multiple websites to obtain research data, wherein the multiple websites are crawled by the performing web crawling in dependence on extracted data extracted by the examining the user browsing data; and providing an action decision in dependence on the research data, wherein the action decision includes a decision to transmit a communication to the user on behalf of a certain service provider.

20 Claims, 8 Drawing Sheets

(56) References Cited

U.S. PATENT DOCUMENTS

| | | | | |
|---|---|---|---|---|
| 10,693,991 | B1* | 6/2020 | Jenkins | H04L 67/2847 |
| 2009/0164522 | A1* | 6/2009 | Fahey | H04L 63/30 |
| 2011/0288924 | A1 | 11/2011 | Thomas et al. | |
| 2014/0136278 | A1 | 5/2014 | Carvalho | |
| 2015/0012363 | A1* | 1/2015 | Grant | G06Q 30/0269 |
| | | | | 705/14.66 |
| 2016/0078507 | A1* | 3/2016 | Shivaswamy | G06Q 30/0629 |
| | | | | 705/26.2 |
| 2017/0109767 | A1 | 4/2017 | Shpanya et al. | |
| 2017/0140285 | A1* | 5/2017 | Dotan-Cohen | G06F 9/453 |
| 2021/0158420 | A1* | 5/2021 | Canfield | G06Q 30/0643 |
| 2021/0201359 | A1* | 7/2021 | Sekar | G06Q 30/0244 |
| 2022/0124411 | A1* | 4/2022 | Saxena | G06Q 50/01 |

OTHER PUBLICATIONS

"About unique product identifiers", retrieved on Feb. 21, 2020 from the Internet URL: <https://support.google.com/merchants/answer/160161?hl=en>, 5 pgs.

"What Are Product Identifiers & GTIN's?", retrieved on Feb. 21, 2020 from the Internet URL: <http://blog.linnworks.com/what are-product-identifiers>, 7 pgs.

Steiner, I., "What Online Merchants Should Know about Unique Product Identifiers", retrieved on Feb. 21, 2020 from the Internet URL: <http://www.ecommercebytes.com/cab/abu/y214/m04/abu0356/s04>, EcommerceBytes-Update, No. 356—Apr. 6, 2014, 12 pgs.

"A System and Method for Generating Dynamic Promotion on Common Items when Customer Visits the Store after a Recent Visit to a Competitor Store" IPCOM000252886D, Feb. 20, 2018, 4 pgs.

* cited by examiner

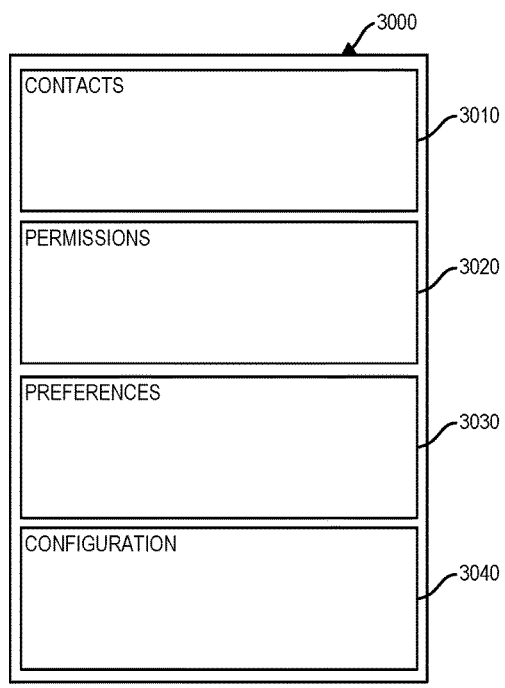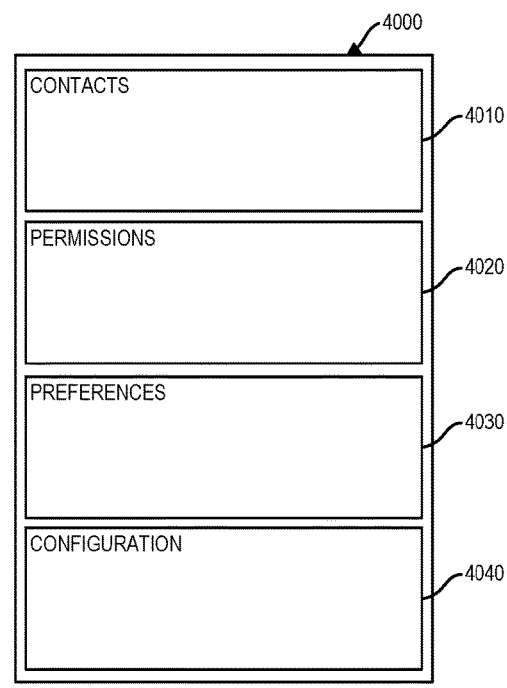
FIG. 3
FIG. 4

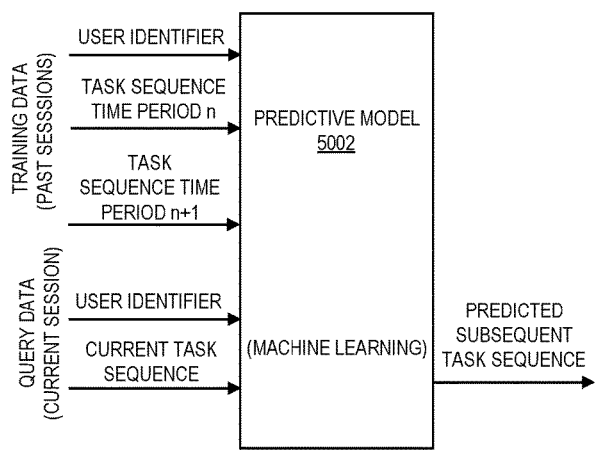 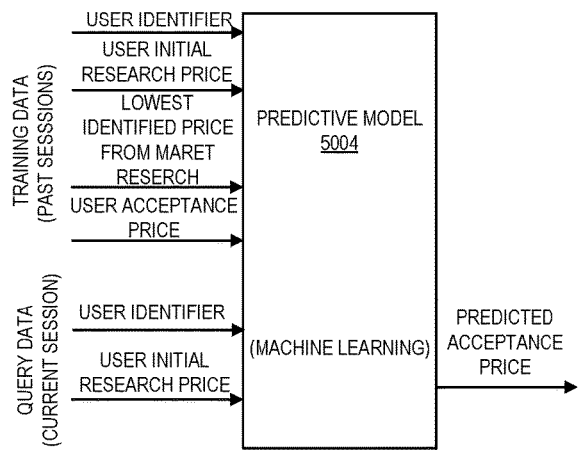
FIG. 5A
FIG. 5B

INTELLIGENT INTERFACE ACCELERATING

BACKGROUND

Data structures have been employed for improving operation of computer system. A data structure refers to an organization of data in a computer environment for improved computer system operation. Data structure types include containers, lists, stacks, queues, tables and graphs. Data structures have been employed for improved computer system operation e.g. in terms of algorithm efficiency, memory usage efficiency, maintainability, and reliability.

Artificial intelligence (AI) refers to intelligence exhibited by machines. Artificial intelligence (AI) research includes search and mathematical optimization, neural networks and probability. Artificial intelligence (AI) solutions involve features derived from research in a variety of different science and technology disciplines ranging from computer science, mathematics, psychology, linguistics, statistics, and neuroscience. Machine learning has been described as the field of study that gives computers the ability to learn without being explicitly programmed.

SUMMARY

Shortcomings of the prior art are overcome, and additional advantages are provided, through the provision, in one aspect, of a method. The method can include, for example: obtaining user browsing data from a browser plugin of a client computer device, the client computing device being associated to the user; examining the user browsing data; classifying a current activity of the user in dependence on the examining the user browsing data, wherein the classifying includes classifying the current activity of the user as searching for a service provider; in response to classifying the current activity of the user as searching for a service provider, performing web crawling on multiple websites to obtain research data, wherein the multiple websites are crawled by the performing web crawling in dependence on extracted data extracted by the examining the user browsing data; and providing an action decision in dependence on the research data, wherein the action decision includes a decision to transmit a communication to the user on behalf of a certain service provider.

In another aspect, a computer program product can be provided. The computer program product can include a computer readable storage medium readable by one or more processing circuit and storing instructions for execution by one or more processor for performing a method. The method can include, for example: obtaining user browsing data from a browser plugin of a client computer device, the client computing device being associated to the user; examining the user browsing data; classifying a current activity of the user in dependence on the examining the user browsing data, wherein the classifying includes classifying the current activity of the user as searching for a service provider; in response to classifying the current activity of the user as searching for a service provider, performing web crawling on multiple websites to obtain research data, wherein the multiple websites are crawled by the performing web crawling in dependence on extracted data extracted by the examining the user browsing data; and providing an action decision in dependence on the research data, wherein the action decision includes a decision to transmit a communication to the user on behalf of a certain service provider.

In a further aspect, a system can be provided. The system can include, for example, a memory. In addition, the system can include one or more processor in communication with the memory. Further, the system can include program instructions executable by the one or more processor via the memory to perform a method. The method can include, for example: obtaining user browsing data from a browser plugin of a client computer device, the client computing device being associated to the user; examining the user browsing data; classifying a current activity of the user in dependence on the examining the user browsing data, wherein the classifying includes classifying the current activity of the user as searching for a service provider; in response to classifying the current activity of the user as searching for a service provider, performing web crawling on multiple websites to obtain research data, wherein the multiple websites are crawled by the performing web crawling in dependence on extracted data extracted by the examining the user browsing data; and providing an action decision in dependence on the research data, wherein the action decision includes a decision to transmit a communication to the user on behalf of a certain service provider.

Shortcomings of the prior art are overcome, and additional advantages are provided, through the provision, in one aspect, of a method. The method can include, for example: obtaining user browsing data from a client computer device, the client computing device being associated to the user; examining the user browsing data; classifying a current activity of the user in dependence on the examining the user browsing data; performing web crawling on multiple websites to obtain research data; and providing an action decision in dependence on the research data, wherein the action decision includes a decision to transmit a communication to the user on behalf of a certain service provider.

Shortcomings of the prior art are overcome, and additional advantages are provided, through the provision, in one aspect, of a method. The method can include, for example: obtaining user browsing data from a client computer device, the client computing device being associated to the user; examining the user browsing data; performing web crawling on one or more website to obtain research data; and providing an action decision in dependence on the research data.

Additional features are realized through the techniques set forth herein. Other embodiments and aspects, including but not limited to methods, computer program product and system, are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

FIG. 3 depicts a user interface according to one embodiment;

FIG. 4 depicts a service provider user interface according to one embodiment;

FIG. 5A depicts a predictive model that can be trained by machine learning according to one embodiment;

FIG. 5B depicts a predictive model that can be trained by machine learning according to one embodiment;

DETAILED DESCRIPTION

Figure 1:
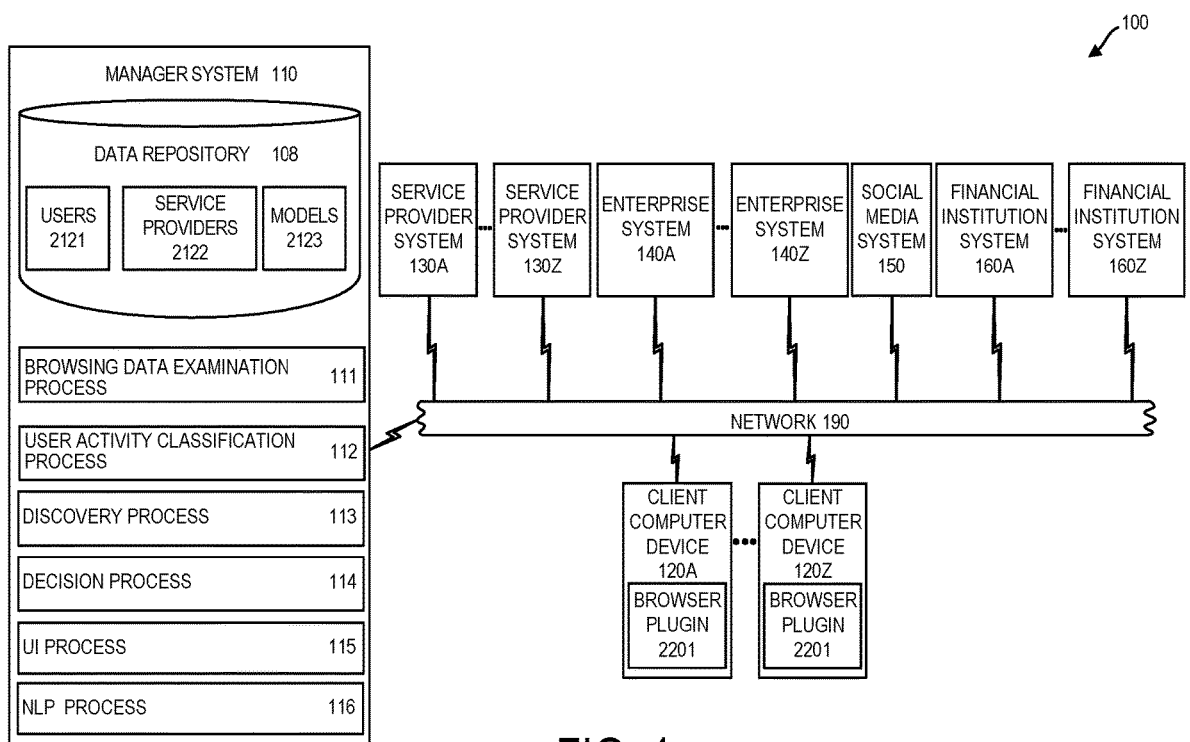
FIG. 1 depicts a system having a manager system, client computer devices, service provider systems, enterprise systems, a social media system and financial institution systems according to one embodiment.

System 100 for use in classification in acceleration of computer device user tasks as shown in FIG. 1. System 100 can include manager system 110 having an associated data repository 108, client computer devices 120A-120Z, service provider systems 130A-130Z and enterprise systems 140A-140Z, social media system 150 and financial institution systems 160A-160. Manager system 110, client computer devices 120A-120Z, service provider systems 130A-130Z, enterprise systems 140A-140Z, social media system 150, and financial institution systems 160A-160Z can be in communication with one another via network 190. System 100 can include numerous devices which can be computing node based devices connected by network 190. Network 190 can be a physical network and/or a virtual network. A physical network can be, for example, a physical telecommunications network connecting numerous computing nodes or systems such as computer servers and computer clients. A virtual network can, for example, combine numerous physical networks, or parts thereof, into a logical virtual network. In another example, numerous virtual networks can be defined over a single physical network.

In one embodiment, manager system 110 can be external to client computer devices 120A-120Z, service provider systems 130A-130Z, enterprise systems 140A-140Z, social media system 150, and financial institution systems 160A-160Z. In one embodiment, manager system 110 can be collocated with one or more of client computer devices 120A-120Z, service provider systems 130A-130Z, enterprise systems 140A-140Z, social media system 150 and/or financial institution systems 160A-160Z.

In one embodiment, each of client computer devices 120A-120Z can be associated with a certain user. In one embodiment, users of system 100 can include registered users. Respective ones of the different client computer devices 120A-120Z can be associated with a different user. Client computer devices 120A-120Z can be computing node devices provided by a client computer, e.g., a smart phone or tablet, a laptop, smartwatch, or PC that runs one or more program e.g., including a web browser for opening and viewing webpages.

Social media system 150 can include a collection of files, including for example, HTML files, CSS files, image files, and JavaScript files. Social media system 150 can be a social website such as FACEBOOK® (Facebook is a registered trademark of Facebook, Inc.), TWITTER® (Twitter is a registered trademark of Twitter, Inc.), LINKEDIN® (LinkedIn is a registered trademark of LinkedIn Corporation), or INSTAGRAM® (Instagram is a registered trademark of Instagram, LLC). Computer implemented social networks incorporate messaging systems that are capable of receiving and transmitting messages to client computers of participant users of the messaging systems. Messaging systems can also be incorporated in systems that that have minimal or no social network attributes. A messaging system can be provided by a short message system (SMS) text message delivery service of a mobile phone cellular network provider, or an email delivery system. Manager system 110 can include a messaging system in one embodiment. During a process of registration wherein a user of system 100 registers as a registered user of system 100, a user sending registration data can send, with permission data defining the registration data, a permission that grants access by manager system 110 to data of the user within social media system 150. On being registered, manager system 110 can examine data of social media system 150 e.g. to determine whether first and second users are in communication with one another via a messaging system of social media system 150. A user can enter registration data using a user interface displayed on a client computer device of client computer devices 130-130Z. Entered registration data can include e.g. name, address, social media account information, other contact information, biographical information, background information, preferences information, and/or permissions data e.g. can include permissions data allowing manager system 110 to query data of a social media account of a user provided by social media system 150 including messaging system data and any other data of the user. When a user opts-in to register into system 100 and grants system 100 permission to access data of social media system 150, system 100 can inform the user as to what data is collected and why, that any collected personal data may be encrypted, that the user can opt out at any time, and that if the user opts out, any personal data of the user is deleted.

Data repository 108 of manager system 110 can store various data. In users area 2121, data repository 108 can store data on users of system 100, such as users who are associated with respective ones of client computer devices 120A-120Z. In service providers area 2122, data repository 108 can store data on registered users service providers of system 100. Services herein can be provided by service providers that are associated to service provider systems and service providers associated to enterprise systems 140A-140Z. On being registered into system 100 as a registered service provider user of system 100, the enterprise system associated with the service provider can transition to be referenced as a service provider system of service provider systems 130A-130Z.

According to one embodiment, system 100 can be configured to match and align resources of a service provider to users of services of the service provider. Service providers can provide services such as software support services and other services such as product providing services including retail product support services.

According to one embodiment, manager system 110 can include features that allow manager system 110 to detect current user activity of a user using client computer device 120A and respond accordingly. In one embodiment, manager system 110 can be configured to detect that a user is currently engaged in a search of a service providing enterprise and in response to such detecting can accelerate search activities of a user who is using a client computer device.

System 100 can be configured so that when a new service provider user registers with system 100, manager system 110 assigns a Universally Unique Identifier (UUID) to that new service provider and stores data associated to that new service provider within service providers area 2122 of data repository 108.

Individual (human) users who register as registered users of system 100 can be registered users who wish that their user interface tasks are automatically detected and accelerated on becoming a registered user. A service provider who registers as a registered service provider of system 100 can be a service provider who can facilitate a service need of a registered user of manager system 110 of system 100.

Manager system 110 can run various processes such as browsing data examination process 111, user activity classification process 112, discovery process 113, decision process 114, and user interface (UI) process 115.

Manager system 110 running browsing data examination process 111 can include manager system 110 receiving and examining browsing data from a client computer device, such as client computer device 120A. Respective client computer devices 120A-120Z can include a browser plugin 2201 that reports client computer device browsing data to manager system 110. Client computer device browsing data can include e.g., (i) browser history data, (ii) browser session logging data, (iii) browser cookies, (iv) browser cache, and (v) browser usage data, as are described herein.

Manager system 110 running user activity classification process 112 can classify a current task of a user who is using a client computer device, such as client computer device 120A. Manager system 110 running user activity classification process 112 can classify a current client computer device activity of a user in dependence on an examination of browsing data performed by manager system 110 running browsing data examination process 111. Manager system 110 running user activity classification process 112 can determine that a user is currently engaged in the user activity of searching for a suitable service provider, such as a retail product service provider or a services service provider.

Manager system 110 running discovery process 113 can accelerate user activities of users once those activities are identified. For example, on the detection that a user is engaged in the activity of searching for a service provider, manager system 110 running discovery process 113 can activate web crawling commands for use in accelerating the user's search for a service provider.

Manager system 110 running decision process 114 can return an action decision to determine whether a service provider will message the user of a client computer device to facilitate the selection of a service provider as a selected service provider. Manager system 110 running decision process 114 can manage a scoring process in which the acceptability of an offer to provide a service is scored. The scoring formula used by manager system 110 can include multiple factors, such as e.g., a profitability factor, a provider urgency factor, and a user urgency factor.

Manager system 110 running UI process 115 can cause presentation of a user interface feature on a client computer interface that facilitates user selection of a certain service provider as a selected service provider.

Manager system 110 can run natural language processing (NLP) process 116 to process data for preparation of records that are stored in data repository 108 and for other purposes. Manager system 110 can run NLP process 116 for determining one or more NLP output parameter of a message. NLP process 116 can include one or more of a topic classification process that determines topics of messages and output one or more topic NLP output parameter, a sentiment analysis process which determines sentiment parameter for a message, e.g. polar sentiment NLP output parameters, "negative," "positive," and/or non-polar NLP output sentiment parameters, e.g. "anger," "disgust," "fear," "joy," and/or "sadness" or other classification process for output of one or more other NLP output parameters, e.g. one of more "social tendency" NLP output parameter or one or more "writing style" NLP output parameter. Manager system 110 can run natural language processing (NLP) process 116 to extract entity topics, e.g. to extract common entries in advertisements, online retails store webpages, receipts and invoices such as dates, phone numbers, companies, and prices.

By running of NLP process 116, manager system 110 can perform a number of processes including one or more of (a) topic classification and output of one or more topic NLP output parameter for a received message (b) sentiment classification and output of one or more sentiment NLP output parameter for a received message or (c) other NLP classifications and output of one or more other NLP output parameter for the received message.

Topic analysis for topic classification and output of NLP output parameters can include topic segmentation to identify several topics within a message. Topic analysis can apply a variety of technologies e.g. one or more of Hidden Markov model (HMM), artificial chains, passage similarities using word co-occurrence, topic modeling, or clustering. Sentiment analysis for sentiment classification and output of one or more sentiment NLP parameter can determine the attitude of a speaker or a writer with respect to some topic or the overall contextual polarity of a document. The attitude may be the author's judgment or evaluation, affective state (the emotional state of the author when writing), or the intended emotional communication (emotional effect the author wishes to have on the reader). In one embodiment sentiment analysis can classify the polarity of a given text as to whether an expressed opinion is positive, negative, or neutral. Advanced sentiment classification can classify beyond a polarity of a given text. Advanced sentiment classification can classify emotional states as sentiment classifications. Sentiment classifications can include the classification of "anger," "disgust," "fear," "joy," and "sadness."

Manager system 110 running NLP process 116 can include manager system 110 returning NLP output parameters in addition to those specification topic and sentiment, e.g. can provide sentence segmentation tags, and part of speech tags. Manager system 110 can use sentence segmentation parameters to determine e.g. that an action topic and an entity topic are referenced in a common sentence for example.

Figure 2:
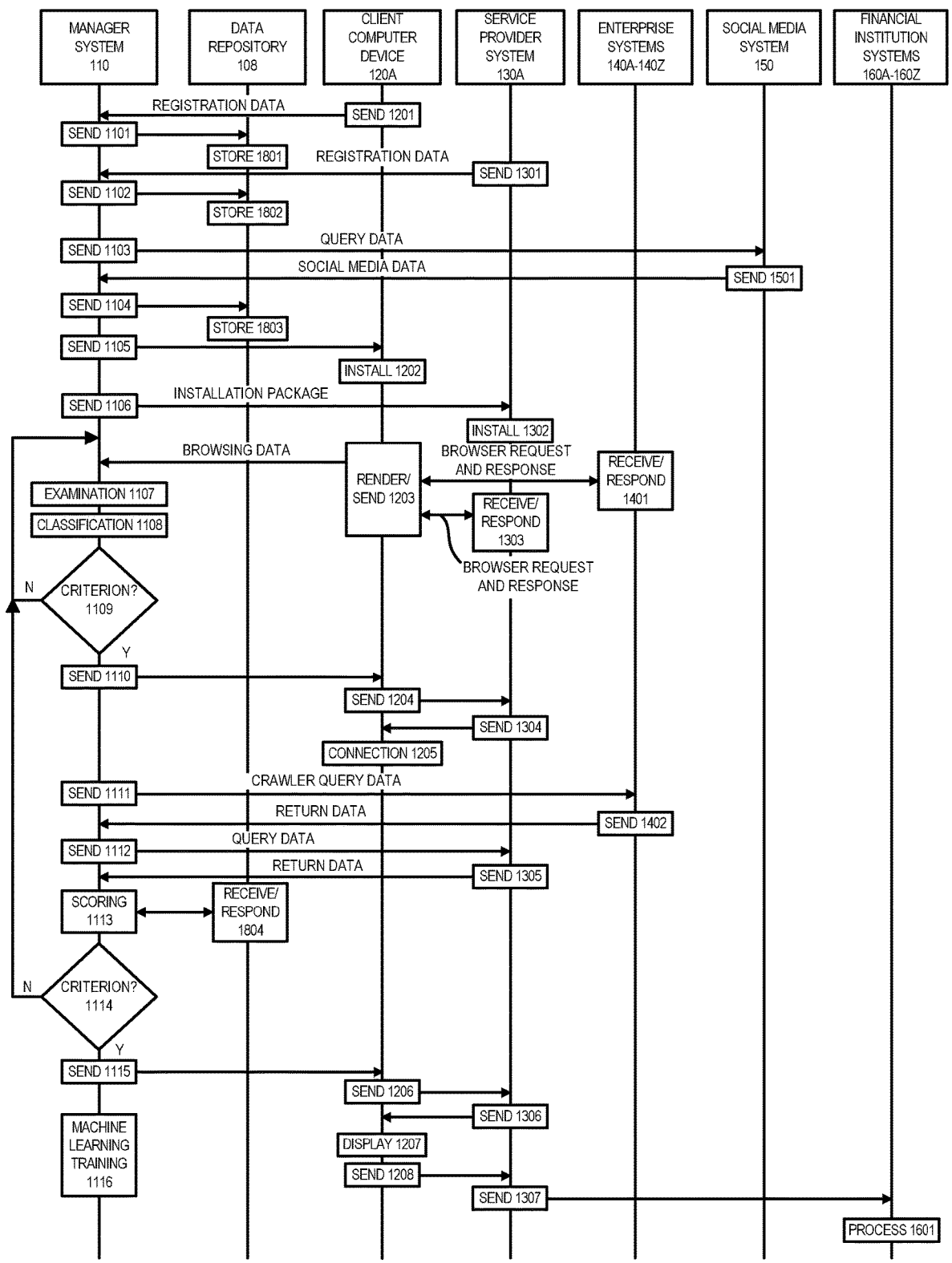
FIG. 2 is a flowchart illustrating a method for performance by a manager system interoperating with other components according to one embodiment.

A method for performance by manager system 110 interoperating with a client computer device 120A, service provider system 130A, enterprise systems 140A-140Z, social media system 150, and financial institution systems 160A-160Z is illustrated in the flow chart of FIG. 2. At block 1201, client computer device 120A can be sending registration data of a user to manager system 110. Registration data can be defined by a user of client computer device 120A and receipt of the registration data. Manager system 110 can send the registration data for receipt and storage by data repository 108 of manager system 110 at block 1801.

Registration data can be defined by a user using user interface 3000 as shown in FIG. 3. User interface 3000 can be a displayed user interface displayed on display of a client computer device 120A-120Z. In contacts area 3010, the user can enter contact's information such as name, address, phone number, e-mail address, social media address, and so forth.

In permissions area 3020, a user can define permissions to facilitate use of personal data of a user by system 100. Permissions data defined in permissions area 3020 can include e.g., permissions to access user data stored on a client computer device of a user and permissions to access and use social media data of a user stored on a social media system such as social media system 150. A user in preferences area 3030 can specify preferences of a user, e.g., likes and dislikes, the products and services that are more important to a user, and what products and services are less important to a user.

Preferences area 3030 can present survey data to a user which is responded to by a user for extraction of preferences by the user. The user, in configuration area 3040, can define configuration data defined by a user which can include configuration data that specifies attributes of the operation of system 100 for a particular user.

At block 1301, an administrator user of service provider system 130A can be sending registration data of a service provider user. On receipt of the service provider registration data, manager system 110 at block 1102 can send the service provider registration data for receipt and storage by data repository 108 at block 1802. Registration data of a service provider can be defined with use of a service provider user interface 4000 as shown in FIG. 4.

In contacts area 4010, the service provider administrator can specify contacts for a service provider e.g., names and addresses of venues, distribution centers, warehouses and the like, phone number, social media, account information and so forth.

In permissions area 4020, the administrator user of a service provider can define permissions e.g., permissions to access inventory data of a service provider, sales data of a service provider, and other business planning information of a service provider.

In preferences area 4030 of user interface, an administrator user of a service provider can define preferences of a service provider. In configuration area 4040, an administrator user of a service provider can enter configuration data to adjust operating attributes of system 100.

At block 1103, manager system 110 can send query data to social media system 150 to access content of social media system 150 of a user. In response to the query data, social media system 150 at block 1501 can send social media data of a user to manager system 110 for examination by manager system 110. On receipt of the social media data, manager system 110 can send, at block 1104, social media data to data repository 108 for receipt and storage by data repository 108 at block 1803. On receipt of the social media data sent at block 1501, manager system 110 can subject received social media data to processing by NLP process 116.

Social media data stored at block 1803 can include raw social media data and structured social media data that specifies e.g., topics of interest to users and sentiments associated to such topics as extracted by running of NLP process 116.

At block 1105, manager system 110 can send an installation package for receipt and installation by a client computer device 120A at block 1202. The installation package received and installed at block 1202 can include e.g., libraries and executable code to facilitate the functioning of client computer device 120A in system 100. The installation package can include e.g., software code to define browser plugin 2201 as described in FIG. 1. Browser plugin 2201 can facilitate the reporting of client computer devices 120A-120Z of browsing data, which browsing data can include e.g., (i) browser history data, (ii) browser session logging data, (iii) browser cookies, (iv) browser cache, and (v) browser usage data, as are described herein. At block 1106, manager system 110 can send an installation package for receipt in installation by a service provider system 130A at block 1302.

Installation package received and installed at block 1302 can include e.g., libraries and executable code to facilitate functioning of service provider system 130A within system 100. The installation package received and installed at block 1302 can include e.g., software code to facilitate the reporting of business planning data to manager system 110 such as inventory data and sales data for use by manager system 110 in determining an urgency factor associated to a service consumer and service provider.

With installation packages installed on client computer device 120A and on service provider system 130A, manager system 110 is configured to classify tasks of a user and to respond to classification of a user task, the actions to accelerate performance of a user task.

Permissions area 3020 of user interface 3000 can include permissions to install a browser plugin into a browser of a client computer device of the user so that browsing data can be reported to manager system 110 for examination and return of action decisions by manager system 110.

Further referring to the flowchart of FIG. 2, client computer device 120A at block 1203 can be reporting browsing data for receipt and examination by manager system 110 at block 1107. Based on the examination of the browsing data, manager system 110 can perform classification at block 1108 of an activity of a user and at block 1109 can determine whether a criterion has been satisfied at block 1109. Browser plugin 2201 of client computer device 120A can be sending browsing data to manager system 110 at block 1203. Browsing data can include data in various browsing data categories such as (i) browser history data, (ii) browser session logging data, (iii) browser cookies, (iv) browser cache, and (v) browser usage data. Browser session logging data can be maintained by client computer device 120A and can include a log of commands executed by a browser during a browsing session. In one aspect, browser session logging data can include a record of unique websites visited.

Browser usage data of category (v) can include e.g. browsing data not included in the browsing data classifications of (i)-(iv) herein. For example, browser usage data can include webpages received from website hosting servers of enterprise systems 140A-140Z that are visited by a user which are not cached. Browser usage data can also include webpage form field data, e.g. text based content entered into forms by user of client computer device 120A. Browser usage data can also include a record of button activations of a user, e.g. shopping cart button activations when interacting with the displayed webpage. According to one embodiment, browser plugin 2201 for sending browser usage data of classification (v) can forward each webpage received by client computer device 120A that is rendering on client computer device 120A to manager system 110 at block 1203. In response to receipt of the received webpages at examination block 1107, manager system 110 can process the webpage without rendering the received webpages, e.g. by subjecting received webpages to natural language processing at examination block 1107. It has been described herein that manager system 110 with use of predictive model 5002 can predict whether a user is preparing to search for a service provider.

At block 1203 a user can be browsing webpages served by one or more system of enterprise systems 140A-140Z and/or service provider system 130A. Enterprise systems 140A-

140Z can be receiving and responding to browser queries from client computer device 120A at block 1401. Service provider system 130A can be receiving and responding to browser queries from client computer device 120A at block 1301. While browsed webpages browsed by a user are rendered at block 1203 on a display of client computer device 120A, client computer device 120A, for providing browsing data can send at block 1203, by browser plugin 2201 (FIG. 1), content of rendered webpages rendered on client computer device 120A to manager system 110. There is set forth herein a method wherein the method includes receiving registration data from the user and in response to the receiving registration data from the user, sending to the client computer device 120A a client computer device installation package having software code which when installed on the client computer device installs the browser plugin 2201 on a web browser of the client computer device 120A, wherein the web browser renders on a display of the client computing device 120A webpage data served by a computing node based system external to the computing node based manager system and wherein the browser plugin is configured to forward data of the rendered webpage data to the computing node based manager system 110, wherein the data of the rendered webpage data defines content of the user browsing data obtained by the computing node based system.

The examination of browsing data at block 1107 by manager system 110 can include examination to determine the current user activity of a user using client computer device 120A. In one embodiment, manager system 110 at block 1107 can perform examination of browsing data of a user to determine whether the activity classification of a user is the activity classification of a user "searching for a service provider". According to one example of the classification of "searching for a service provider", the user can be searching for a service provider to provide an online retail product. Classifications that can be returned by manager system 110 at block 1108 can include, e.g., (a) "inactive"; (b) "browsing unrelated to identification of a service provider"; (c) "preparing to search of the service provider"; and (d) "searching for a service provider".

For performing classification of a user activity, manager system 110 can examine browsing data for data that indicates that a certain action of a user has occurred. According to one example, manager system 110 at blocks 1107 and 1108 can examine browsing data to determine whether the user has e.g. clicked a shopping cart button of a user interface of client computer device 120A to place an online identified article, such as a product for purchase, into an online shopping cart. The browsing data, including browser usage data in such a situation, can reference a product and can reference a shopping cart. Based on the user placing an online item into an online shopping cart, manager system 110 at block 1108 can return the classification of the user task classification of "searching for service provider" and can also return (a) a product identifier for the identified researched product of the user which the user is considering acquiring, and (b) a price for the identified product, which can be tagged as the user's researched price. Unique product identifiers in common usage include Global Trade Item Numbers (GTINs), International Standard Book Number (ISBN), Manufacturer Part Numbers (MPNs), and brand names. Where the product identifier is not unique, manager system 110 can query appropriate mapping data resources so that the product is correctly identified. Manager system 110 can subject received browsing data to natural language processing by NLP process 112 in order to return entity topics, including product entity topics, and price entity topics, to facilitate identification of product identifiers and prices. Manager system 110 can assign the identified price associated to the researched product of the user an order number (=price_1, =price_2, . . . ), in dependence on the number of times during iterations of block 1108 the user has been observed to have researched a new price for the researched product. Thus, manager system 110 can assign the initial researched price for a researched product of a user the data tag of =price_1.

For determining a classification of user activity in some embodiments, manager system 110 can query a predictive model 5002 stored in models area 2123 of manager system 110. Referring to predictive model 5002, predictive model 5002 can be iteratively trained with the use of training data which training data can include successive iterations of user browsing data which is received and examined at block 1107. Examining of browsing data at block 1107 can include storing of such browsing data into data repository 108. Training data for training predictive model 5002 can include iteratively applied training data wherein each iteration of training data comprises a task sequence at time period n in combination with a task sequence at time period n+1. With each new iteration of training data of time period, n is advanced. Trained as described predictive model 5002 can learn a relationship between a current task sequence and a subsequent task sequence such as the next task sequence. Thus, for example, with use of predictive model 5002, manager system 110 can learn and respond to a demonstrated user behavior of the user that prefaces the user's searching for a service provider online. Take for example a user who exhibits the browsing behavior pattern of always visiting a personal banking website and then a social media website prior to searching online for a service provider. Predictive model 5002 can be trained to recognize the pattern of visiting a personal banking website and then a social media website as behavior prefacing searching for service provider and in response to the behavior being exhibited can classify a current computer device activity of the user as "preparing to search for a service provider".

Predictive model 5002, once trained, is able to respond to query data. Query data for querying predictive model 5002 can include a current task sequence of a user, e.g. as may be mapped to website visited and website buttons activated in one example. When predictive model 5002 is queried with query data defined by a current task sequence, predictive model 5002 is able to output a predicted subsequent task sequence of a user based on the training data that has been applied to predictive model 5002. Manager system 110 can use predictive model 5002, trained as described, at examining block 1107. For example, at examination block 1107, manager system 110 can query predictive model 5002 with data defining a current task sequence of the user and can then examine output by predictive model 5002 in response to the query data. The output data can be a predicted subsequent task sequence. If the predicted subsequent task sequence output by predictive model 5002 includes the task e.g. of clicking an online shopping cart button, manager system 110 at examining block 1107 can determine that a predicted subsequent task of the user is searching for a service provider and accordingly can determine that the user is currently engaged in the activity of preparing to search for a service provider.

Predictive model 5002 on the return a classification of user activity of "preparing to search of service provider" which refers to activity of a user prior to the user commencing searching for a service provider can accelerate operation of the described user interface, e.g. including by facilitating a proactive network connection between client computer device 120A and service provider system 130A as described in connection with blocks 1110, 1204, 1304, and 1205.

Embodiments herein recognize that multiple classifications of user activity can be returned at block 1108. For example, user activity can be classified as being inactive, arbitrary browsing (browsing activity unrelated to search for a service provider), preparing to search for a service provider, or searching for a service provider as may be indicated by a recognized entity domain matching a list of signature entity domains. According to one example, the identification of a shopping cart website click and/or the identification of the entity topic of an online shopping cart extracted using natural language processing can return the classification of current user activity as (d) "searching for a service provider".

According to one embodiment, manager system 110 can be configured so that for each different classification within the described activity classifications (a)-(d), manager system 110 can select a different sending process for sending browsing data from client computer device 120A to manager system 110. When manager system 110 determines during an iteration of block 1108 that there is a new activity level classification for a current user, manager system 110 can appropriately send a communication to client computer device 120A to activate a browsing data sending process that is associated to the new classification. Manager system 110 can be configured to activate a browsing data sending process according to the decision data structure of Table A.

TABLE A

| Row | User Activity Classification | Browsing Data Sending Process |
|---|---|---|
| 1 | (a) "inactive" | Process A |
| 2 | (b) "browsing unrelated to identification of a service provider" | Process B |
| 3 | (c) "preparing to search of the service provider" | Process C |
| 4 | (d) "searching for a service provider" | Process D |

Manager system 110 can be configured so that additional classifications of browsing data can be enabled for each successive descending row of the decision data structure of Table A. As set forth herein, categories of browsing data can include: (i) browser history data, (ii) browser session logging data, (iii) browser cookies, (iv) browser cache, and (v) browser usage data. According to one embodiment, when process A is active, only browsing data in category (i) and (ii) may be enabled for transmission. When process B is active, only browsing data categories (i), (ii), and (iii) can be enabled for transmission. When process C is active, only browsing data of categories (i), (ii), (iv) and (v) can be enabled for transmission. When process D is active, only browsing data of categories (i), (ii), (iv) and (v) can be enabled for transmission. When process D is active, browsing data of each of the categories (i), (ii), (iv) and (v) can be enabled for transmission. Thus, when manager system 110 by appropriate communication to client computer device 120A activates a new browsing data transmission process corresponding to a next descending row of Table A, manager system 110 can increase rate at which browsing data is sent and received, e.g. in bits per second (bps). The respective browsing data sending processes associated to Rows 1-4 can further have respectively increasing transmission frequencies. By reason of the described transmission frequency functionality and/or the described browsing data category functionality where additional categories are enabled for transmission in descending rows of Table A, transitioning to a new browsing data sending process associated to a descending row, and increase the rate at which browsing data is transmitted from client computing device 120A to enterprise system. Intelligently controlling a rate of browsing data transmission, e.g. increasing a rate when certain activity is detected to selectively facilitate more granular examination of activity conserves computing resources on the sending end and receiving end.

At block 1109, manager system 110 can determine that a criterion has been satisfied. In one example, the criterion can be that that targeted classification e.g., (c) "preparing to search for service provider" has been satisfied. In one example, the criterion can be that that the targeted classification e.g. (d) "searching for service provider" has been satisfied. In one example, the criterion can be that at least one of the targeted classification, e.g., (c) "preparing to search for service provider" or (d) "searching for service provider" has been satisfied. If manager system 110 at block 1109 determines that a criterion has not been satisfied, manager system 110 can return to receive and examine for classification additional browsing data. It will be seen that manager system 110 can iteratively perform the loop of blocks 1107-1109 to iteratively perform examination and classification using new iterations of obtained browsing data until a condition is satisfied. It will be seen that manager system 110 can be iteratively updating a current classification of user activity while manager system performs the loop of blocks 1107-1109. Where manager system 110 at block 1109 determines that a criterion is satisfied, manager system 110 can proceed to block 1110.

At block 1110, manager system 110 can message client computer device 120A so that client computer device 120A establishes a client server connection to service provider system 130A (if not present). In response to receipt of the messaging data sent at block 1110, client computer device 120A at block 1204 can send a connection request to service provider system 130A at block 1204. In response to the connection request, the service provider system 130A at block 1304 and client computer device 120A at block 1205 can establish a client server connection between client computer device 120A and service provider system 130A so that a client computer device 120A can receive webpages from service provider system 130A. In response to completion of block 1110, manager system 110 can proceed to block 1111.

At block 1111, manager system 110 can send web crawling command data for receipt by enterprise systems 140A-140Z. In response to the criterion determined to be satisfied at block 1109, manager system 110 can emulate searching activity of a user searcher. Thus, at block 1111, crawling command data can be sent to various enterprise systems 140A-140Z to emulate search queries sent by a user in searching for service providers. Enterprise systems 140A-140Z can be associated to service providers that are competitor service providers of the service provider associated to service provider system 130. A web crawler can perform crawling in accordance with a list of Universal Resource Locators (URLs) to visit. A web crawler can identify hyperlinks within pages visited and can add them to the list of URLs to visit. The web crawler can store data of webpages visited in data repository 108 as it proceeds. For performing web crawling at block 1111, manager system 110 can crawl according to a list of the top N online retail product websites for the product category of the identified product. Manager system 110 in data repository 108 can store top N lists for multiple product categories.

In response to receipt of web crawling command data, enterprise systems 140A-140Z can send at block 1402 research return data resulting from the crawling command data sent at block 1111. Research return data sent at block 1402 can include webpages specifying a searched for product detected to be searched for at classification block 1108 and associated pricing data. Manager system 110 can subject returned webpages to natural language processing by NLP process 112 to extract product identifiers associated to pricing data.

At block 1112, manager system 110 can send query data to service provider system 130A for return of business planning data which can be sent by service provider system 130A at block 1305. Business planning data can include e.g., cost data of a searched for product searched for by a user at block 1203 determined to be searched for by a user at block 1108, and inventory data of such product. Business planning data can be made available from enterprise application software (EAS) running on respective service provider systems 130A-130Z.

Based on the received data received in response to send blocks 1111 and 1112, manager system 110 can proceed to scoring block 1113. At block 1113, manager system 110 can examine returned data returned at block 1402 and block 1305. The examining of returned data returned at block 1402 can include performing natural language processing on returned webpage data returned from the web crawler query data sent at block 1111 to extract from webpages of competitors of the certain service provider prices of products identified by the product identifier. The examining of returned data returned at block 1305 can include examining cost data and inventory data of the enterprise associated to service provider system 130A for the product identified by the product identifier.

At scoring block 1113, manager system 110 can return an action decision as to whether an offer should be sent to client computer device 120A on behalf of the service provider enterprise associated service provider system 130A. For return of the action decision at block 1113, manager system 110 can apply Eq. 1 as follows:

$$S = F_1 W_1 + F_2 W_2 + F_3 W_3 \quad \text{(Eq. 1)}$$

Where S is an acceptability score, $F_1$, $F_2$, and $F_3$ are different factors and $W_1$-$W_3$ are weights associated to the various factors $F_1$, $F_2$, and $F_3$. According to one embodiment, factor $F_1$ can be a profitability factor, factor $F_2$ can be a service provider urgency factor, and factor $F_3$ can be a user (service consumer) urgency factor.

With use of Eq. 1, manager system 110 can determine whether to present the user with an offer in dependence on profitability of the offer and also in dependence on urgency as determined from the perspective of the service provider associated, i.e., the enterprise associated to service provider system 130A and from the perspective of the user associated to client computer device 120A. Embodiments herein recognize a variety of factors in addition to profitability can be used in determining whether to render an offer.

For determining profitability under factor $F_1$, manager system 110 can evaluate one or more candidate offer price for presentment to the user on behalf of the service provider enterprise associated service provider system 130A with use of research data received in response to web crawling command data provided by crawler query data sent at block 1111 as well as business planning data e.g., cost data to a service provider and/or inventory or other business planning data received in response to query data sent at block 1112. For determination of the one or more candidate offer for evaluation according to one embodiment, manager system 110 can use the extracted price associated to the identified searched product of the user identified at block 1108. Manager system 110, for example, can select a candidate price to be just below such extracted price (e.g. at predetermined or dynamically determined threshold percentage of the extracted price. For determination of the one or more candidate offer according to one embodiment, manager system 110 can use the extracted price associated to the identified searched product of the user identified at block 1108 as well as extracted competitor prices using returned webpage data returned from the web crawling query data sent at block 1111. Manager system 110, for example, can evaluate a range of candidate offer prices that are between about an initial researched price of a user and a lowest identified price resulting from examination of the returned webpage data resulting from the web crawl initiated at block 1111.

Manager system 110 can determine provider urgency factor $F_2$ in dependence on a plurality of subfactors. The plurality of subfactors can be, for example, a seasonal subfactor and an overstock subfactor. According to a seasonal subfactor, manager system 110 can assign a higher than baseline value under factor $F_2$ where a product is out of season and can assign a lower than baseline value under factor $F_2$ when a product is in season. According to an overstock subfactor, manager system 110 can assign a higher than baseline value under factor $F_2$ where a product is overstocked and can assign a lower score under factor $F_2$ where a product is not overstocked. Manager system 110 can examine returned inventory and business planning data returned at 1302, including data from enterprise application software (EAS) running on service provider system 130A to provide a value under factor F2.

Manager system 110 can assign scores under factor $F_3$, user urgency, in dependence on a variety of subfactors. The variety of subfactors can include an influencer subfactor and a preference subfactor. According to an influencer subfactor, manager system 110 can assign a higher than baseline value according to factor $F_3$ where the user is an influencer and can assign a lower than baseline value under factor $F_3$ where the user is not an influencer. Manager system 110 can determine that the user is an influencer based on social media data of the user which can received in response to send block 1501. Manager system 110 can determine that a user is an influencer by examining posts data of a user. According to factor $F_3$, a user can be assigned a score under factor $F_3$ in dependence on a rate of consumer product posts of the user (i.e. related to or unrelated to the identified searched for product of the user). That is, a user who regularly posts about consumer products in that user's social media data can be assigned a higher than baseline value under factor $F_3$ than a user who never posts about consumer products or rarely posts about consumer products. Manager system 110 can subject received posts data to natural language processing by NLP process 112 in order to extract entity topics within social media posts to thereby ascertain a consumer product related posts rate of a user. According to a preference subfactor under factor $F_3$, manager system 110 can assign a value under factor $F_3$ in dependence on a preference level of a user associated to a product identified as being searched for at block 1108. Manager system 110 can assign a higher than a baseline value under factor F3 where a user is determined to have a positive preference for the product identified as being searched for at block 1108. Manager system 110 can assign a lower than baseline value under factor F3 where a user is determined to have a negative preference for a product identified as being searched for at block 1108. Manager system 110 can subject received social media posts data to natural language processing by NLP process 112 in order to extract entity topics and sentiment values within social media posts to thereby ascertain whether the product identified as the product searched for at block 1108 has been the subject of positive sentiment posts by the user. Manager system 110, according to one embodiment, can assign a value under factor F3 in dependence on the rate or number of positive sentiment posts of the user associated to identified searched for product identified at block 1108. Manager system 110 can aggregate assigned values associated to a factor. Social media data of the user examined for determination of a value under factor F3 can include social media data returned at send block 1501. Social media data of the user examined for determination of a value under factor F3 can additionally or alternatively include social media data returned in response to send block 1112 which send block 1112 can be adapted to send query data to social media system 150 as well as service provider system 130A.

In some embodiments, manager system 110 at block 1113 can return a plurality of acceptability scores S, each score being associated to a respective candidate offer prices, e.g. a first higher price (such as a price just below an initial research price of the user), an intermediate candidate price and a lowest candidate price. It will be seen that in some scenarios the returned S scoring value might exceed a threshold in the case of the highest candidate price, but that the returned S scoring value might not exceed the threshold in the case of the intermediate or lowest candidate price. In such a scenario where only the highest candidate price triggers and S score passing a threshold, manager system 110 can select the highest candidate price (e.g. a price just below the user's initial browsed and researched price).

In embodiments where manager system 110 evaluates a plurality of respective candidate offer prices, manager system 110 can determine the range of candidate offer prices using returned webpage data returned at block 1402. At block 1013, manager system 110 can perform natural language processing to extract from webpages of competitors of the enterprise associated to the identified searched for product of the user at block 1108 a list of competitor prices for the identified researched product. Determining candidate price offers evaluated using Eq. 1 can include using the competitor prices of the product identified by examining the returned data returned at block 1402. For example, manager system 110 can select a candidate offer price for evaluation using Eq. 1 to be equal to the lowest observed price in a list of competitor prices for the identified researched product extracted from the returned data returned at 1402.

In some embodiments, manager system 110 can query predictive model 5004 for returning a candidate price for evaluation using Eq. 1. Predictive model 5004 as shown in FIG. 5B can be trained with training data selected so that when predictive model 5004 is trained, predictive model 5004 is able to predict a given user's shopping behavior subsequently to identifying an initial researched price for a certain product. Predictive model 5004 once trained, for example, can predict whether a current user is the type of user (a) who will shop extensively at a plurality of websites to identify a lowest possible price for a certain product after identifying an initial price, or alternatively whether the current user is (b) the type of user who will not research extensively for a better price after identifying an initial price. Predictive model 5004 can be trained with use of iteratively applied training datasets. Each dataset iteration for training of predictive model 5004 can include the following training data items, each associated with a common prior historical session: (a) user identifier; (b) user initial researched price; (c) lowest identified price from market research, and (d) user acceptance price. Manager system 110 can extract the items forming such iteratively applied dataset by subjecting browsing data of the user received at block 1108 in historical interactive support sessions of system 100 to natural language processing. Predictive model 5004 can be trained with the described dataset for multiple historical sessions mediated by system 100 using data stored in data repository 108.

Predictive model 5004 once trained has knowledge of a relationship between a given user's initial research price, the lowest identified price from market research and the user's acceptance price. Manager system 110 can determine the market research price by subjecting returned website data returned in response to crawler query data at block 1111 to natural language processing by NLP process 112. Embodiments herein recognize that users who thoroughly research data sources for lowest price tend to have for a given session an acceptance price closer to the lowest price, while users who are of the type who do not extensively research data sources for a lower price will tend to have an acceptance price for a given session closer to the user initial research price.

Predictive model 5004 once trained is able to respond to query data. Query data for querying of predictive model 5004 can include the dataset including a combination of (a) user identifier, and (b) user initial research price for the current session. Predictive model 5004, when queried with the described query data, can output a predicted acceptance price for the user during a current interactive support session.

In a scenario where multiple different prices trigger a scoring value S that exceeds the threshold, the highest candidate price (e.g. just under the user's initial researched price for the researched product), according to one embodiment, can be selected as the price to offer the user. According to some embodiments, manager system 110 at block 1113 can use predictive model 5004 to return a prediction as to the acceptance price of a purchase offer for the searched for product detected to be searched for at block 1108. Manager system 110 in some embodiments can use such returned predicted price as a price for evaluation in the scoring formula Eq. 1 set forth herein. Use of predictive model 5004 can accelerate operation of a user interface by avoiding the activity of a user searching multiple sites to arrive at a suitable offer.

In one embodiment, manager system 110 at block 1113 can query a predictive model of models area 2123 that outputs a prediction for the user's acceptance price in dependence on a current market research activity level of the user within a current interactive support session subsequent to the user identifying an initial price for a certain product. The described predictive model can output a prediction that the user will accept a higher price (e.g. just under the initial researched price) in the case that the market research activity is below a low threshold and can output a prediction that the acceptance price will be lower, i.e. close to the lowest researched price from the web crawled data queried at block 1111 in the case that the market research activity subsequent to the user identifying an initial research price is above a high threshold. The described activity level can serve as a measure of the user's real time aggressiveness in terms of identifying the lowest price. The market research activity level of the user can be determined by way of examination by manager system 110 of browsing data received in response to the sending at block 1203. According to one example, a user's market research activity level in researching a price offered by competitors subsequent to the user identifying an initial researched price can be ascertained based on the count of different online retailer service provider websites visited by the user per a preset time period, e.g. per minute sites, per 30 second time period, per 10 second time period, etc. Thus, with reference to the user interface of FIG. 6, manager system 110 can replace the depicted offered price specified within window 6052 of $111.99 with the new price of $105.95 in response to manager system 110 examining browsing data of the user to ascertain a rate at which the user visits different online retailer service provider websites. Manager system 110 can be configured to reduce a candidate price evaluated in Eq. 1 and offered to a user in the case that a "spike" is observed user's activity level in researching a price by competitors subsequent. Such spike conditions can be satisfied e.g. by manager system 110 detecting that the user has visited a threshold exceeding the number of service provider websites offering a product in common with the researched product identified at block 1108 within a predetermined time window, e.g. 30 seconds, 1 min. There is set forth herein a method that includes manager system 110 subsequent to the extracting price data and a product identifier associated to an identified searched for product of a user, examining further browsing data of the user to ascertain a rate with which the user visits different online retailer service provider websites subsequent to the extracting during a current browsing session of client computer device 120A, and in response to the ascertained rate exceeding a threshold updating notification data presented to the user so that the user is presented with new text that specifies an updated price.

At decision block 1114, manager system 110 can decide that an offer is to be presented to the user of client computer device 120A on the condition that the acceptability score S determined using Eq. 1 exceeds a threshold such as a predetermined threshold or an adaptively determined threshold.

Manager system 110 performing scoring block 1113 can include manager system 110 performing multiple queries on data repository 108 as indicated by receive and respond block 1804 for determination e.g. of service provider preferences and/or user preferences. On completion of scoring block 1113, manager system 110 can proceed to block 1114 to determine whether a criterion has been satisfied. The criterion can be the criterion that the scoring of a perspective offer exceeds a threshold value, e.g. a predetermined threshold value or dynamically determined threshold value. In the case that the criterion has not been satisfied, manager system 110 can loop back as indicated to iteratively examine next browsing data at examination block 1107 and can iteratively perform the loop of blocks 1107-1114 until criterion has been satisfied at block 1114. It will be seen that manager system 110 can iteratively perform the loop of blocks 1107-1114 to iteratively perform examination and classification using new iterations of obtained browsing data until a condition is satisfied. It will be seen that manager system 110 can be iteratively updating a current classification of user activity while manager system 110 iteratively performs the loop of blocks 1107-1114. In some cases, the criterion of block 1114 might not be satisfied if a threshold scoring value S associated to Eq. 1 is not exceeded. In some cases, the criterion of block 1114 might not be satisfied if there is insufficient data, e.g. as may occur where the user is preparing to search for service provider prior to searching for a service provider. In the case that the criterion of block 1114 is satisfied, e.g., that the scoring determined using Eq. 1 exceeds the threshold, manager system 110 can proceed to block 1115.

Figure 6:
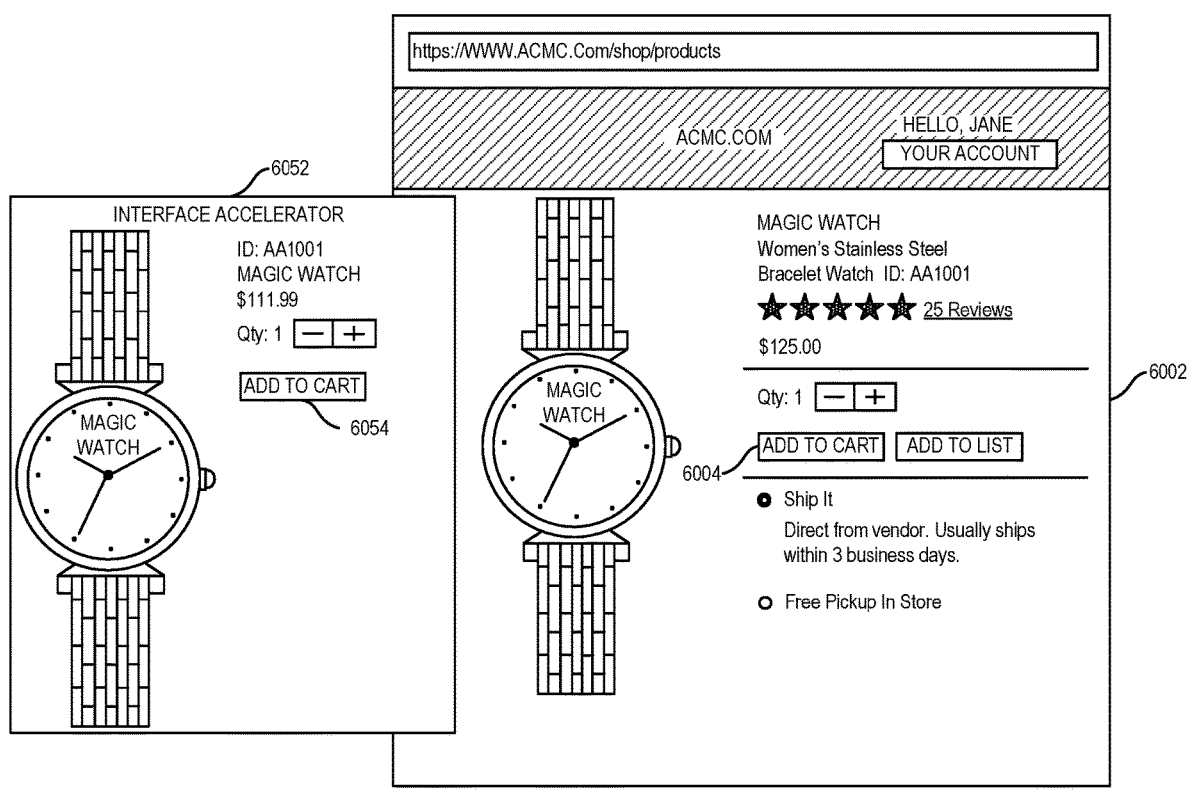
FIG. 6 depicts webpages that can be rendered on a display of a client computer device to define a user interface according to one embodiment.

At block 1115, manager system 110 can send messaging data to client computer device 120A and on receipt of the messaging data sent at block 1115, client computer device 120A at block 1206 can send webpage request data to service provider system 130A which can responsively send window 6052 defined by a user interface webpage at block 1306 to client computer device 120A for display on a display of client computer device 120A at block 1207. Window 6052 defined by a webpage as depicted in FIG. 6 can present a text based displayed offer, e.g. comprising the text based data "$111.99" specified in FIG. 6. On completion of block 1207, client computer device 120A can proceed to block 1208.

At block 1208, client computer device 120A, in response to acceptance of a displayed offer displayed on the webpage sent at block 1305, can send offer acceptance data to service provider system 130A which can receive the offer acceptance data and at block 1307 can responsively send transaction data to financial institution systems 160A-160Z which can process the transaction data at block 1601 to appropriately credit an account of an enterprise associated to service provider system 130A and debit an account associated to the user of client computer device 120A.

On completion of block 1115, manager system 110 can proceed to block 1116 to perform machine learning training to train predictive models for use by manager system 110 in the return of action decisions.

At block 1116, manager system 110 can perform machine learning training to train predictive models that have been stored in data repository 108 based on observed and recorded data of a just completed user browsing session. According to one example, predictive model 5002 and predictive model 5004 as shown in FIG. 5A can be iteratively trained with machine learning training data to ascertain that a user is preparing to author a product review. Subsequent to block 1116, manager system 110 can return to block 1107. It will be seen that manager system 110 can iteratively perform the loop of blocks 1107-1116 to iteratively perform examination and classification and scoring using new iterations of obtained browsing data and return until a condition is satisfied, e.g. a browsing session is terminated by the user. It will be seen that manager system 110 can be iteratively updating a current classification of user activity while manager system 110 iteratively performs the loop of blocks 1107-1116. On termination of a browsing session, manager system 110 can return to block 1107 to wait for new browsing data of a next session. Manager system 110 can be performing multiple instances of the service providing a loop of blocks 1107-1116 simultaneously for multiple client computer devices.

Referring to predictive model 5002, predictive model 5002 can be iteratively trained with the use of training data which training data can include successive iterations of user browsing data which is received and examined at block 1107. Examining of browsing data at block 1107 can include storing of such browsing data into data repository 108. Training data for training predictive model 5002 can include iteratively applied training data wherein each iteration of training data comprises a task sequence at time period n in combination with a task sequence at time period n+1. With each new iteration of training data of time period, n is advanced. Trained as described, predictive model 5002 can learn a relationship between a current task sequence and a subsequent task sequence such as the next task sequence. Thus, for example, with use of predictive model 5002, manager system 110 can learn and respond to a demonstrated user behavior of the user that prefaces the user's searching for a service provider online. Take for example a user who exhibits the browsing behavior pattern of always visiting a personal banking website and then a social media website prior to searching online for a service provider. Predictive model 5002 can be trained to recognize the pattern of visiting a personal banking website and then a social media website as behavior prefacing searching for service provider and in response to the behavior being exhibited can classify a current computer device activity of the user as preparing to search for a service provider.

Further aspects of the operation of system 100 during performance of the method described in connection with the flowchart of FIG. 2 are described in FIG. 6. FIG. 6 illustrates webpage 6002 on a display of client computer device 120A being used by the user. The display of webpage 6002 on a display of client computer device 120A can occur at block 1203 in which client computer device 120A is engaged with the user browsing of various websites.

With further reference to FIG. 6, a user at block 1203 can be browsing websites having webpages and can be viewing displayed webpage 6002. The stage depicted in FIG. 6 can correspond to a stage depicted in FIG. 2 where manager system 110 can examine received browsing data at block 1107 and at classification block 1108 can activate browsing data process D associated to the current user activity of "searching for a service provider" which determination can be returned e.g. by manager system 110 identifying that a "shopping cart" webpage button 6004 has been clicked and/or detecting the entity topic "add to cart" by way of natural language processing by natural language process 116. On the determination at block 1114 that an offer is to be rendered to the user, manager system 110 at send block 1115 can trigger a communication to cause window 6052 as shown in FIG. 6 to be displayed at block 1207. Window 6052 can be displayed on a display of client computer device 120A so that window 6052 can be simultaneously displayed with webpage 6002. At the time the triggering communication is sent at block 1115, the user can be viewing webpage 6002 which can be a webpage served by the enterprise that operates service provider system 130A or alternatively webpage 6002 can be a webpage served by an entity of one of enterprise systems 140A-140Z. A user viewing window 6052 can click the button 6054 ("add to cart") in order to indicate acceptance of the offer triggered by manager system 110 by send block 1115.

At machine learning block 1116, the data accumulated during the current browsing session leading to the communication at block 1115 can be stored in data repository 108 and can be used for training of predictive models of models area 2123 such as predictive model 5002 and predictive model 5004 as set forth herein. In addition, each iteration of browsing data received for examination as in examination block 1107 can be processed for iterative training of predictive models such as predictive models 5002, and 5004 at block 1107. Thus, predictive accuracies associated with predictive model 5002 and predictive model 5004 can improve during the course of a certain browsing session e.g. a browsing session as described in the flowchart of FIG. 2.

Various available tools, libraries, and/or services can be utilized for implementation of predictive models set forth herein including predictive model 5002 and predictive model 5004. For example, a machine learning service can provide access to libraries and executable code for support of machine learning functions. A machine learning service can provide access to a set of REST APIs that can be called from any programming language and that permit the integration of predictive analytics into any application. Enabled REST APIs can provide e.g. retrieval of metadata for a given predictive model, deployment of models and management of deployed models, online deployment, scoring, batch deployment, stream deployment, monitoring and retraining deployed models. According to one possible implementation, a machine learning service provided by IBM® WATSON® can provide access to libraries of APACHE® SPARK® and IBM® SPSS® (IBM® WATSON® and SPSS® are registered trademarks of International Business Machines Corporation and APACHE® and SPARK® are registered trademarks of the Apache Software Foundation). A machine learning service provided by IBM® WATSON® can provide access to a set of REST APIs that can be called from any programming language and that permit the integration of predictive analytics into any application. Enabled REST APIs can provide e.g. retrieval of metadata for a given predictive model, deployment of models and management of deployed models, online deployment, scoring, batch deployment, stream deployment, monitoring and retraining deployed models. Training predictive models such as predictive model 5002 and predictive model 5004 can include use of e.g. support vector machines (SVM), Bayesian networks, neural networks and/or other machine learning technologies.

Embodiments herein recognize that coupons and incentives tend to be random and un-targeted. Service consumers don't receive the incentives when they really want them. Embodiments herein can orchestrate competition between the retail service providers on the fly with substantial and dynamic insights into service consumer requirements.

Embodiments herein recognize that without system 100, a loyal ACME service consumer user (with ACME credit card) may be interested in a watch model AA1001 available at ACME for $125. Without system 100, the user may shop at BIGSTORE (same price), MAGICSTORE (same price) and ABCInc. and find that the same watch model AA1001 at ABCInc. for $63.99. In such a situation, the user can be expected to acquire from ABCInc. and ACME loses the opportunity to provide the product and accelerate the user's search. With system 100, ACME as a user service provider can register with system 100. With ACME registered, the service consumer user can be presented with an offer on behalf of ACME immediately upon manager system 110 detecting that the service consumer user is searching for service providers to provide the watch on other websites (immediately on the user shopping at BIGSTORE). The user interface activity of the user is accelerated and the service consumer user is aligned with a service provider (ACME).

According to a system and method, there can be provided an (a) initiate product identification process which can uniquely identify the product which the service consumer is trying to browse. There can also be provided (b) a web crawling process that crawls the same product on other websites and online retailers. There can also be provided (c) a price compute process that check the prices and promotions (free shipping, money back etc.) across all the other websites and online retailers. There can also be provided (e) an enumerate process which can list down the competitive prices and incentives (free shipping, money back etc.) which it can offer to the service consumer. There can also be provided (f) a criticality process which can pull out the sense of urgency with which it wants to get rid off (sell) the product to the user. There can also be provided (g) a new price analysis process which can update the pricing and promotions dynamically (based on the above factors) for sometime (may be few minutes) for the service consumer for that particular session. There can also be provided (h) an iterative auction process which can orchestrate a passive auction of the product for the service consumer.

Regarding identifying a product uniquely, products can be identified through standard IDs throughout the online retail and internet space. In case the IDs are present according to a different set of rules, appropriate mappings can be used across databases to uniquely identify the products.

Regarding crawling online retailers, web crawlers can be used to crawl online retailers to check the prices of the product under consideration. Items checked can include list down promotions by others: discounts; free shipping; coupons; credit card points; bonus points and rewards. List down promotions which can be given: discounts; free shipping; coupons; credit card points; bonus points and rewards.

Regarding detecting a sense of urgency, manager system 110 can determine e.g. whether a product is a low selling product which needs to be sold off ASAP from the seller or whether it is off season for the product. Regarding detecting a sense of urgency, manager system 110 can determine how important the service consumer is for the seller. Regarding detecting a sense of urgency, manager system 110 can determine how important the product is for the service consumer. Manager system 110 can determine whether a service provider is making profit even after selling the product at the new price.

An exemplary method can include the following. (1) A service consumer user can receive product details during product browsing such as (a) on the product details or list or preview screen, (b) over voice based virtual assistants and/or (c) display devices at fully automated on line stores. (2) Detect that the delivered product details include pricing or promotions or both. (3) Determine whether the service consumer is, or has recently been, exploring the product at competitors (other sellers) using (a) cookies, shared browser data/cache, (b) IoT based search history, e.g. smart TV. (4) Predict a sense of urgency including e.g. (a) by computing an urgency score based on the weights assigned to factors and/or (b) product urgency for service consumer can be derived e.g. based on purchase history, social media data and/or IoT data. (5) Decide whether to match pricing and promotions based on an urgency score threshold e.g. (a) threshold can be initially configured and then updated using machine learning (e.g. service consumers with urgency score higher than x never bought the product, but the configured threshold is y with y>x, so change the threshold from y to x). (6) Determine competition pricing and promotion e.g. (a) for either each common competitor or each competitor in the list derived out of step 3 above and/or (b) using web crawling methods. (7) Compare the pricing and promotions with each competitor to determine the most competitive competitor e.g. (a) preferably, single-product-cart value can be compared to assure that no promotion is missed, (b) optionally, if there are other items (products or services) in the cart, value for the same/similar cart can be compared based on which all of those items the competitor sells (c) natural language processing can be used to understand integrational offers (e.g. cash back on credit cards) and/or (d) globally unique product identifiers can be used to match the competitor products. (8) Match the pricing and promotions with the most competitive competitor e.g. (a) for the ongoing product browsing/shopping session, for a configured amount of time (e.g. for next 5 minutes) and/or (b) considering other items in the cart. (9) Update and deliver the matched pricing and promotions (a) at the website, (b) over voice and/or (c) using natural language and/or voice synthesis.

Certain embodiments herein may offer technical computing advantages, including computer systems to address the problems arising in the realm of computer systems. Embodiments herein can include user interface acceleration features for accelerating the operation of a user interface, e.g. for online searching for service providers. Embodiments herein, for example, can autodetect that a user is searching or preparing to search for a service provider and can responsively and automatically present to a user a notification on behalf of a service provider. Embodiments herein can detect with use of a predictive model trained by machine learning using historical training data that a user is preparing to search for a service provider. In response to determination that a user is preparing to search for a service provider, embodiments herein can proactively make a client server connection between a client computer device of the user and a computing node based system offering a relevant service, such as an online retail service. A predictive model can be trained by machine learning to learn a user's behavior in researching additional offers after identifying an initial offer for a product. Embodiments herein can use such a trained predictive model to return action decisions such as an action decision to send to a user a notification that specifies an offer to the user. Embodiments herein can dynamically adjust a data rate at which browsing data is transmitted for examination from a client computer device associated to a user in dependence on a detected activity classification of the user. Embodiments herein can predict user behavior based on historical browsing data of the user, and can return action decisions accordingly to accelerate operation of a user interface. A fundamental aspect of operation of a computer system is its interoperation to which it operates including human actors. By increasing the accuracy and reliability of information presented to human users, embodiments herein increase the level of engagement of human users for enhanced computer system operation. Various decision data structures can be used to drive artificial intelligence (AI) decision making, such as decision data structures that drive decisions regarding the presentment of prompting data. Decision data structures as set forth herein can be updated by machine learning so that accuracy and reliability is iteratively improved over time without resource consuming rules intensive processing. Machine learning processes can be performed for increased accuracy and for reduction of reliance on rules based criteria and thus reduced computational overhead. For enhancement of computational accuracies, embodiments can feature computational platforms existing only in the realm of computer networks such as artificial intelligence platforms, and machine learning platforms. Embodiments herein can employ data structuring processes, e.g. processing for transforming unstructured data into a form optimized for computerized processing. Embodiments herein can examine data from diverse data sources such as data sources that process radio signals for location determination of users. Embodiments herein can include artificial intelligence processing platforms featuring improved processes to transform unstructured data into structured form permitting computer based analytics and decision making. Embodiments herein can include particular arrangements for both collecting rich data into a data repository and additional particular arrangements for updating such data and for use of that data to drive artificial intelligence decision making. Certain embodiments may be implemented by use of a cloud platform/data center in various types including a Software-as-a-Service (SaaS), Platform-as-a-Service (PaaS), Database-as-a-Service (DBaaS), and combinations thereof based on types of subscription.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a computer implemented method including: obtaining user browsing data from a browser plugin of a client computer device, the client computing device being associated to the user; examining the user browsing data; classifying a current activity of the user in dependence on the examining the user browsing data, where the classifying includes classifying the current activity of the user as searching for a service provider; in response to classifying the current activity of the user as searching for a service provider, performing web crawling on multiple websites to obtain research data, where the multiple websites are crawled by the performing web crawling in dependence on extracted data extracted by the examining the user browsing data; and providing an action decision in dependence on the research data, where the action decision includes a decision to transmit a communication to the user on behalf of a certain service provider. Other embodiments of this aspect include corresponding computer systems, apparatus, and computer programs recorded on one or more computer storage devices, each configured to perform the actions of the methods.

Implementations may include one or more of the following features. The computer implemented method where the action decision is in dependence on a multi-factor scoring formula, the multi-factor scoring formula including a profitability factor, a service provider urgency factor, and a service consumer urgency factor. The computer implemented method where the examining data of the user browsing data includes extracting a price and a product identifier of a product from webpage data browsed by the user. The computer implemented method where the examining data of the user browsing data includes using natural language processing to extract a price and a product identifier of a product from webpage data browsed by the user. The computer implemented method where the method includes in response to receiving registration data from the client computer device sending a client computer device installation package for to the client computer device for installation on the client computer device and in response to receiving registration data from a service provider system associated to the certain service provider sending a service provider installation package to the service provider system for installation on the service provider system, where the method includes receiving first data from the client computer device, the first data being made accessible by the client computer device installation package after installation of the client computer device installation package on the client computer device, where the method includes receiving second data from the service provider system, the second data being made accessible by the service provider installation package after installation of the service provider installation package on the client computer device, where the providing the action decision in dependence on the research data includes providing the action decision in dependence on the first data and the second data. The computer implemented method where the method includes iteratively performing the obtaining, the examining, and the classifying of the current activity of the user, and iteratively adjusting a browsing data transmission process by which the client computer device transmits the user browsing data for facilitation of the obtaining of the user browsing data, where the iteratively adjusting of the browsing data transmission process is in dependence on a current outcome of the classifying of the current activity of the user. The computer implemented method where the method includes receiving registration data from the certain service provider and in response to the receiving sending to a computing node based system of the certain service provider an installation package having software code which when installed on the computing node based system facilities access to inventory data and cost data of the computing node based system so that the providing an action decision includes providing the action decision in dependence on the inventory data and cost data. The computer implemented method where the method includes, based on the examining, identifying a current classification of activity of the user as preparing to search for a service provider, where the method includes, in response to the identifying a current classification of activity of the user as preparing to search for a service provider and prior to the classifying the current activity of the user as searching for a service provider, triggering a making of a network connection between the client computer device of the user and a website of the certain service provider. The computer implemented method where the obtaining, examining and classifying are performed by a computing node based manager system external to the client computing device, where the method includes receiving registration data from the user and in response to the receiving registration data from the user, sending to the client computer device a client computer device installation package having software code which when installed on the client computer device installs the browser plugin on a web browser of the client computer device, where the web browser renders on a display of the client computing device webpage data served by a computing node based system external to the computing node based manager system and where the browser plugin is configured to forward data of the rendered webpage data to the computing node based manager system, where the data of the rendered webpage data defines content of the user browsing data obtained by the computing node based system. The computer implemented method where the method includes, based on the examining, identifying a current classification of activity of the user as preparing to search for a service provider, where the method includes, in response to the identifying a current classification of activity of the user as preparing to search for a service provider and prior to the classifying the current activity of the user as searching for a service provider, triggering a making of a network connection between the client computer device of the user and a website of the certain service provider, and where the identifying a current classification of activity of the user as preparing to search for a service provider includes querying a predictive model that has been trained by machine learning with training data that includes historical browsing data of the user. The computer implemented method where the method includes, based on the examining, identifying a current classification of activity of the user as preparing to search for a service provider, where the method includes, in response to the identifying a current classification of activity of the user as preparing to search for a service provider and prior to the classifying the current activity of the user as searching for a service provider, sending a communication to the client computer device that increases a rate at which the client computer device transmits the user browsing data to one or more computing node performing the examining and the classifying. The computer implemented method where the examining data of the user browsing data includes subjecting content of the user browsing data to natural language processing to extract a price and a product identifier of a product from a website of a particular service provider that provides online retail services, and where the crawling on multiple websites to obtain research data in respect to a service searched for by the user includes performing natural language processing to extract from webpages of enterprises who are competitors of the particular service provider and the certain service provider prices of products identified by the product identifier. The computer implemented method where the examining data of the user browsing data includes subjecting content of the user browsing data to natural language processing to extract a price and a product identifier of a product from a website of a particular service provider that provides online retail services, and where the crawling on multiple websites to obtain research data in respect to a service searched for by the user includes performing natural language processing to extract from webpages of enterprises who are competitors of the particular service provider and the certain service provider competitor prices of the product identified by the product identifier, where the action decision is in dependence on a multi-factor scoring formula, the multi-factor scoring formula including a profitability factor, a service consumer urgency factor, and a service provider urgency factor, where the method includes, for evaluating the profitability factor determining a candidate offer for sending to the user by the certain service provider, where the determining the candidate offer includes using the competitor prices of the product identified by the product identifier. The computer implemented method where the examining data of the user browsing data includes extracting a price and a product identifier of a product from webpage data browsed by the user, where the providing an action decision includes querying a predictive model to return an output specifying a predicted acceptance price of the user, where the predictive model has been trained with machine learning training data derived by processing historical browsing data of the user to learn of the user's behavior in response to the user identifying an initial price for a product, where the method includes transmitting the communication to the user on behalf of a certain service provider, the communication including a text based notification including text that specifies the product identifier and a second price for the product, where the second price has been determined in dependence on the output specifying a predicted acceptance price of the user. The computer implemented method where the examining data of the user browsing data includes extracting a price and a product identifier of a product from webpage data browsed by the user, and where the action decision is in dependence on a multi-factor scoring formula, the multi-factor scoring formula including a profitability factor, a service provider urgency factor, and a service consumer urgency factor, where the service provider urgency factor is in dependence on: (a) a determination of whether the product is overstocked by the certain service provider, and (b) a determination of whether the product is in season, and where the service consumer urgency factor is in dependence on (i) an ascertaining of a rate of social media posts of the user in respect to consumer products using natural language processing to process social media data of the user, and (ii) an ascertaining of the user's preference level for the product using natural language processing to process social media data of the user. The computer implemented method where the examining data of the user browsing data includes extracting a price and a product identifier of a product from webpage data browsed by the user, where the method includes transmitting the communication to the user on behalf of a certain service provider, the communication including a text based notification including text that specifies the product identifier and an offered price for the product, where the method includes subsequent to the extracting, examining further browsing data of the user to ascertain a rate with which the user visits different online retailer service provider websites subsequent to the extracting during a current browsing session of the client computer device, and in response to the ascertained rate exceeding a threshold updating notification data presented to the user so that the user is presented with new text that specifies an updated price. Implementations of the described techniques may include hardware, a method or process, or computer software on a computer-accessible medium.

Figure 7:
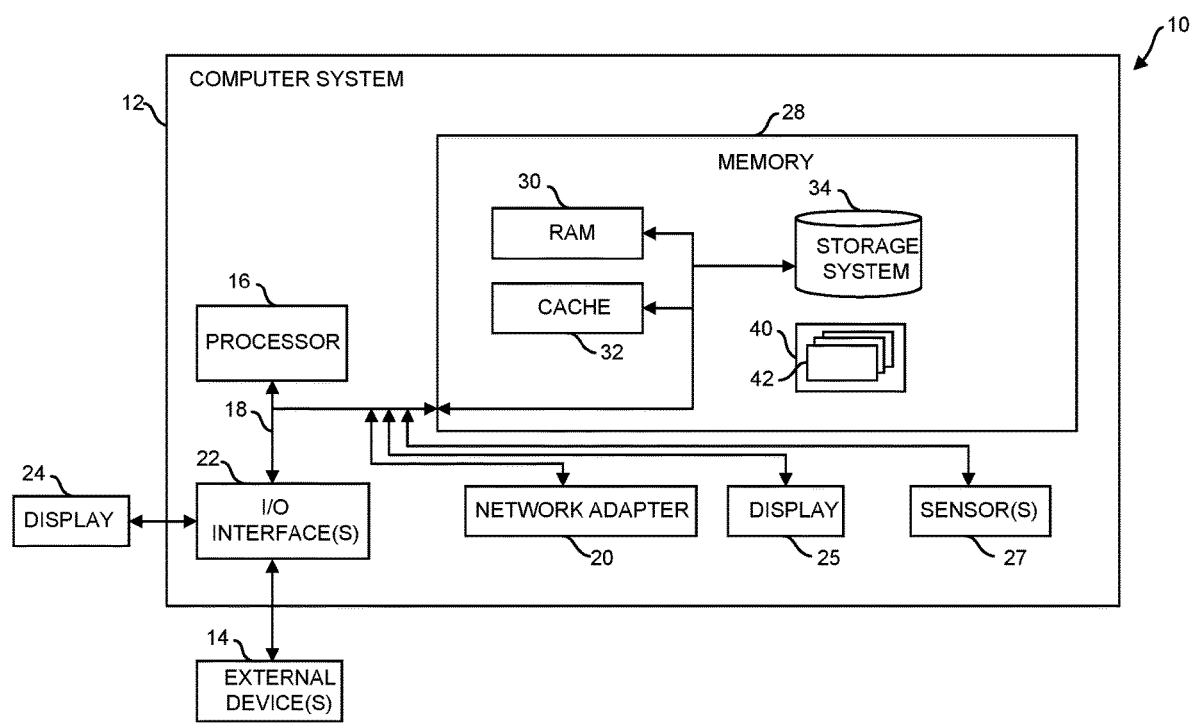
FIG. 7 depicts a computing node according to one embodiment.
Figure 8:
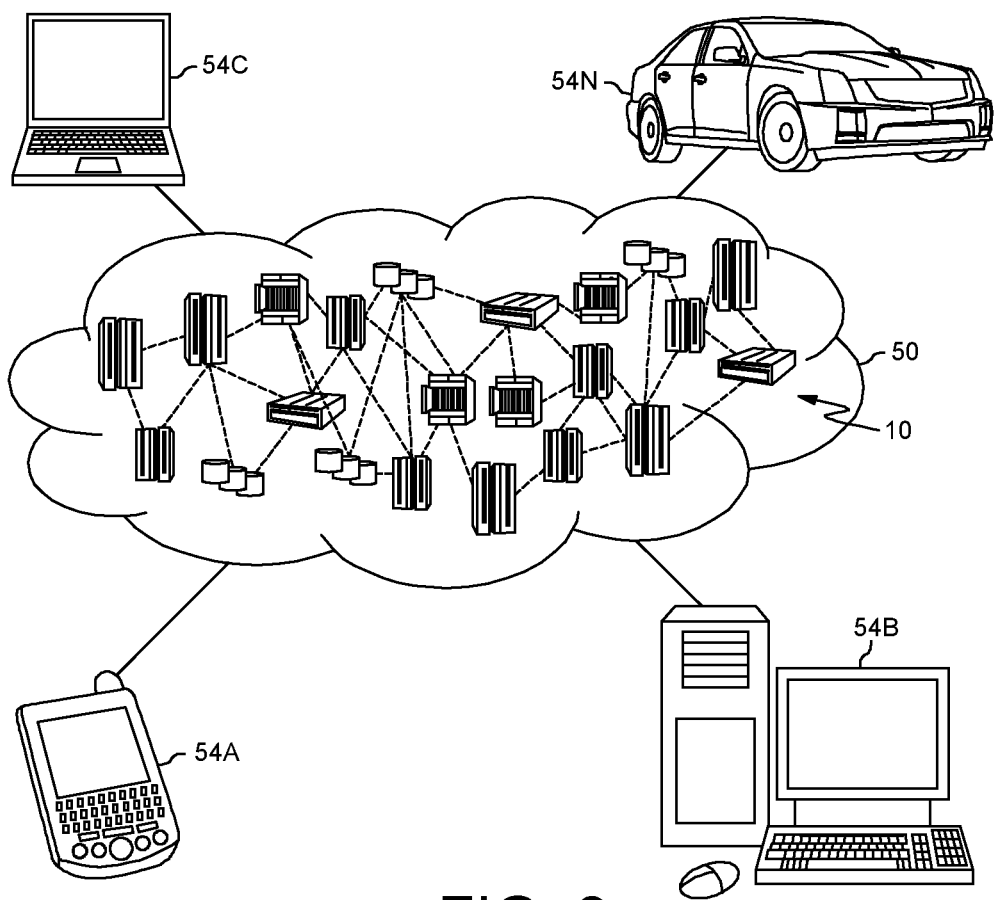
FIG. 8 depicts a cloud computing environment according to one embodiment.
Figure 9:
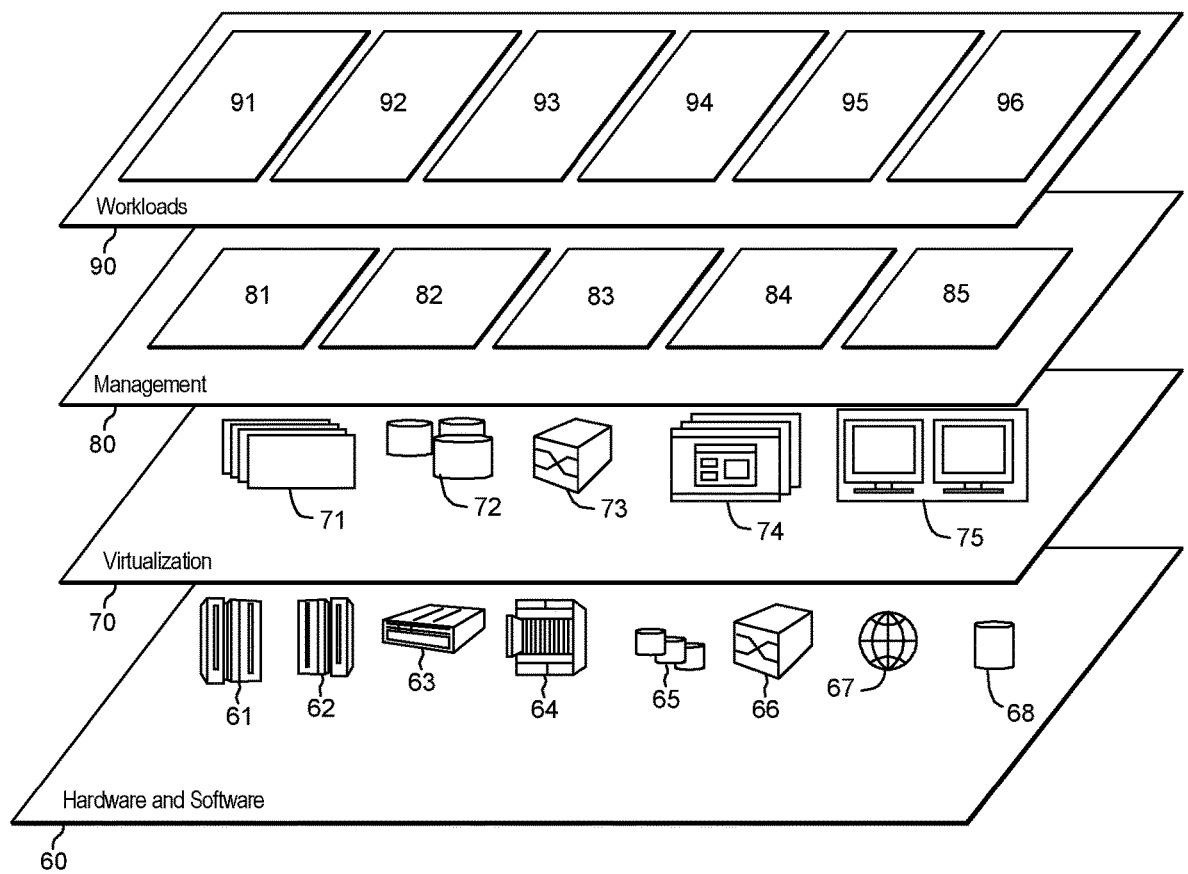
FIG. 9 depicts abstraction model layers according to one embodiment.

FIGS. 7-9 depict various aspects of computing, including a computer system and cloud computing, in accordance with one or more aspects set forth herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 7, a schematic of an example of a computing node is shown. Computing node 10 is only one example of a computing node suitable for use as a cloud computing node and is not intended to suggest any limitation as to the scope of use or functionality of embodiments of the invention described herein. Regardless, computing node 10 is capable of being implemented and/or performing any of the functionality set forth hereinabove. Computing node 10 can be implemented as a cloud computing node in a cloud computing environment, or can be implemented as a computing node in a computing environment other than a cloud computing environment.

In computing node 10, there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system-executable instructions, such as program processes, being executed by a computer system. Generally, program processes may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program processes may be located in both local and remote computer system storage media including memory storage devices.

As shown in FIG. 7, computer system 12 in computing node 10 is shown in the form of a computing device. The components of computer system 12 may include, but are not limited to, one or more processor 16, a system memory 28, and a bus 18 that couples various system components including system memory 28 to processor 16. In one embodiment, computing node 10 is a computing node of a non-cloud computing environment. In one embodiment, computing node 10 is a computing node of a cloud computing environment as set forth herein in connection with FIGS. 8-9.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program processes that are configured to carry out the functions of embodiments of the invention.

One or more program 40, having a set (at least one) of program processes 42, may be stored in memory 28 by way of example, and not limitation, as well as an operating system, one or more application programs, other program processes, and program data. One or more program 40 including program processes 42 can generally carry out the functions set forth herein. In one embodiment, manager system 110 can include one or more computing node 10 and can include one or more program 40 for performing functions described with reference to functions described with reference to manager system 110 as set forth in the flowchart of FIG. 2. In one embodiment, one or more client computer device 120A-120Z can include one or more computing node 10 and can include one or more program 40 for performing functions described with reference to one or more client computer device 120A-120Z as set forth in the flowchart of FIG. 2. In one embodiment, service provider system 130A can include one or more computing node 10 and can include one or more program 40 for performing functions described with reference to service provider system 130A as set forth in the flowchart of FIG. 2. In one embodiment, enterprise systems 140A-140Z can include one or more computing node 10 and can include one or more program 40 for performing functions described with reference to enterprise systems 140A-140Z as set forth in the flowchart of FIG. 2. In one embodiment, social media system 150 can include one or more computing node 10 and can include one or more program 40 for performing functions described with reference to social media system as set forth in the flowchart of FIG. 2. In one embodiment, financial institution systems 160A-160Z can include one or more computing node 10 and can include one or more program 40 for performing functions described with reference to financial institution systems 160A-160Z as set forth in the flowchart of FIG. 2. In one embodiment, the computing node based systems and devices depicted in FIG. 1 can include one or more program for performing function described with reference to such computing node based systems and devices.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc. In addition to or in place of having external devices 14 and display 24, which can be configured to provide user interface functionality, computing node 10 in one embodiment can include display 25 connected to bus 18. In one embodiment, display 25 can be configured as a touch screen display and can be configured to provide user interface functionality, e.g. can facilitate virtual keyboard functionality and input of total data. Computer system 12 in one embodiment can also include one or more sensor device 27 connected to bus 18. One or more sensor device 27 can alternatively be connected through I/O interface(s) 22. One or more sensor device 27 can include a Global Positioning Sensor (GPS) device in one embodiment and can be configured to provide a location of computing node 10. In one embodiment, one or more sensor device 27 can alternatively or in addition include, e.g., one or more of a camera, a gyroscope, a temperature sensor, a humidity sensor, a pulse sensor, a blood pressure (bp) sensor or an audio input device. Computer system 12 can include one or more network adapter 20. In FIG. 8 computing node 10 is described as being implemented in a cloud computing environment and accordingly is referred to as a cloud computing node in the context of FIG. 8.

Referring now to FIG. 8, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing components 96 for detecting user activity and accelerating an interface as set forth herein. The processing components 96 can be implemented with use of one or more program 40 described in FIG. 7.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Forms of the term "based on" herein encompass relationships where an element is partially based on as well as relationships where an element is entirely based on. Methods, products and systems described as having a certain number of elements can be practiced with less than or greater than the certain number of elements. Furthermore, a device or structure that is configured in a certain way is configured in at least that way, but may also be configured in ways that are not listed.

It is contemplated that numerical values, as well as other values that are recited herein are modified by the term "about", whether expressly stated or inherently derived by the discussion of the present disclosure. As used herein, the term "about" defines the numerical boundaries of the modified values so as to include, but not be limited to, tolerances and values up to, and including the numerical value so modified. That is, numerical values can include the actual value that is expressly stated, as well as other values that are, or can be, the decimal, fractional, or other multiple of the actual value indicated, and/or described in the disclosure.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

What is claimed is:

1. A computer implemented method comprising:
    obtaining user browsing data from a client computer device, the client computer device being associated to the user;
    examining the user browsing data;
    classifying a current activity of the user in dependence on the examining the user browsing data, wherein the classifying includes classifying the current activity of the user as searching for a service provider;
    in response to classifying the current activity of the user as searching for a service provider, performing web crawling on multiple websites to obtain research data, wherein the multiple websites are crawled by the performing web crawling in dependence on extracted data extracted by the examining the user browsing data; and
    providing an action decision in dependence on the research data, wherein the action decision includes a decision to transmit a communication to the user on behalf of a certain service provider, wherein the examining the user browsing data includes extracting a product identifier of a product from webpage data browsed by the user, wherein the method includes determining a rate at which the user visits websites offering product items according to the product identifier, and presenting a price for the product to the user in dependence on the determined rate at which the user visits websites offering product items according to the identifier.

2. The computer implemented method of claim 1, wherein the method includes iteratively performing the obtaining, the examining, and the classifying of the current activity of the user, and iteratively adjusting a browsing data transmission process by which the client computer device transmits the user browsing data for facilitation of the obtaining of the user browsing data, wherein the iteratively adjusting of the browsing data transmission process is in dependence on a current outcome of the classifying of the current activity of the user.

3. The computer implemented method of claim 1, wherein the examining data of the user browsing data includes subjecting content of the user browsing data to natural language processing to extract a price and a product identifier of a product from a website of a particular service provider that provides online retail services, and wherein the crawling on multiple websites to obtain research data in respect to a service searched for by the user includes performing natural language processing to extract from webpages of enterprises who are competitors of the particular service provider and the certain service provider prices of products identified by the product identifier.

4. The computer implemented method of claim 1, wherein the examining data of the user browsing data includes one or more of the following selected from the group consisting of (A) subjecting content of the user browsing data to natural language processing to extract a price and a product identifier of a product from a website of a particular service provider that provides online retail services, and wherein the crawling on multiple websites to obtain research data in respect to a service searched for by the user includes performing natural language processing to extract from webpages of enterprises who are competitors of the particular service provider and the certain service provider competitor prices of the product identified by the product identifier, wherein the action decision is in dependence on a multi-factor scoring formula, the multi-factor scoring formula including a profitability factor, a service consumer urgency factor, and a service provider urgency factor, wherein the method includes, for evaluating the profitability factor determining a candidate offer for sending to the user by the certain service provider, wherein the determining the candidate offer includes using the competitor prices of the product identified by the product identifier, and (B) extracting a price and a product identifier of a product from webpage data browsed by the user, and wherein the action decision is in dependence on a multi-factor scoring formula, the multi-factor scoring formula including a profitability factor, a service provider urgency factor, and a service consumer urgency factor, wherein the service provider urgency factor is in dependence on: (a) a determination of whether the product is overstocked by the certain service provider, and (b) a determination of whether the product is in season, and wherein the service consumer urgency factor is in dependence on (i) an ascertaining of a rate of social media posts of the user in respect to consumer products using natural language processing to process social media data of the user, and (ii) an ascertaining of the user's preference level for the product using natural language processing to process social media data of the user.

5. The computer implemented method of claim 1, wherein the examining data of the user browsing data includes extracting a price and a product identifier of a product from webpage data browsed by the user, wherein the providing an action decision includes querying a predictive model to return an output specifying a predicted acceptance price of the user, wherein the predictive model has been trained with machine learning training data derived by processing historical browsing data of the user to learn of the user's behavior in response to the user identifying an initial price for a product, wherein the method includes transmitting the communication to the user on behalf of a certain service provider, the communication comprising a text based notification including text that specifies the product identifier and a second price for the product, wherein the second price has been determined in dependence on the output specifying a predicted acceptance price of the user.

6. The computer implemented method of claim 1, wherein the examining data of the user browsing data includes extracting a price and a product identifier of a product from webpage data browsed by the user, wherein the method includes transmitting the communication to the user on behalf of a certain service provider, the communication comprising a text based notification including text that specifies the product identifier and an offered price for the product, wherein the method includes subsequent to the extracting, examining further browsing data of the user to ascertain a rate with which the user visits different online retailer service provider websites subsequent to the extracting during a current browsing session of the client computer device, and in response to the ascertained rate exceeding a threshold updating notification data presented to the user so that the user is presented with new text that specifies an updated price.

7. The computer implemented method of claim 1, wherein the crawling on multiple websites to obtain research data in respect to a service searched for by the user includes performing natural language processing to extract product pricing information from webpages of enterprises, and wherein the communication to the user on behalf of a certain service provider includes price data determined in dependence on the product pricing information.

8. The computer implemented method of claim 1, wherein the examining data of the user browsing data includes subjecting content of the user browsing data to natural language processing to extract an originally searched for price and a product identifier of a product from a website of a particular service provider that provides online retail services, and wherein the crawling on multiple websites to obtain research data in respect to a product item searched for by the user includes performing natural language processing to extract from webpages of enterprises who are competitors of the certain service provider competitor prices of the product identified by the product identifier, the competitor prices including a lowest competitor price, wherein the method includes determining and evaluating a candidate offer respecting the product identified by the product identifier for sending to the user by the certain service provider with the communication, the candidate offer including a product price intermediate the lowest competitor price and the originally searched for price.

9. The computer implemented method of claim 1, wherein the examining data of the user browsing data includes extracting a price and a product identifier of a product from webpage data browsed by the user, wherein the method includes transmitting the communication to the user on behalf of a certain service provider, the communication comprising a text based notification including text that specifies the product identifier and a second price for the product, wherein the second price has been determined in dependence on a predicted acceptance price of the user.

10. The computer implemented method of claim 1, wherein the examining data of the user browsing data includes extracting a price and a product identifier of a product from webpage data browsed by the user, wherein the method includes transmitting the communication to the user on behalf of the certain service provider, the communication comprising a text based notification including text that specifies the product identifier and a second price for the product, wherein the second price has been determined in dependence on an evaluation of browsing behavior of the user during a current browsing session.

11. The computer implemented method of claim 1, wherein the action decision is in dependence on an ascertaining of a rate of social media posts of the user in respect to consumer products using natural language processing to process social media data.

12. The method of claim 1, wherein the classifying the current activity of the user as searching for a service provider is performed in dependence on examining of user browsing data of the user prior to the user ordering a product.

13. The method of claim 1, wherein the classifying the current activity of the user as searching for a service provider is performed in dependence on examining of user browser data of the user browsing a website of a particular service provider, wherein the particular service provider is different from the certain service provider.

14. The method of claim 1, wherein the classifying the current activity of the user as searching for a service provider is performed in dependence on examining of user browser data of the user placing a product within a shopping cart of a first window of a particular service provider, wherein the particular service provider is different from the certain service provider, wherein the communication to the user on behalf of the certain service provider includes presenting price data of the product within a second window of the certain service provider.

15. The computer implemented method of claim 1, wherein the examining data of the user browsing data includes extracting a user searched price and a product identifier of a product from webpage data browsed by the user, wherein the method includes transmitting the communication to the user on behalf of a certain service provider, the communication comprising a text based notification including text that specifies the product identifier and an offered price for the product, wherein the offered price has been determined in dependence on a purchase history behavior of the user and a result of the performing web crawling on multiple websites to obtain the research data.

16. The method of claim 1, wherein the classifying the current activity of the user in dependence on the examining the user browsing data includes classifying a first activity of the user as belonging to a first classification, subsequently classifying a second activity of the user as belonging to a second classification, and increasing a rate at which browsing data of the user browsing data is transmitted for analysis responsively to an activity of the user transitioning from the first classification to the second classification.

17. The method of claim 1, wherein the classifying the current activity of the user is performed prior prior to ordering of any product by the user.

18. A system comprising:
a memory;
at least one processor in communication with the memory; and
program instructions executable by one or more processor via the memory to perform a method comprising:
obtaining user browsing data from a client computer device, the client computer device being associated to the user;
examining the user browsing data;
classifying a current activity of the user in dependence on the examining the user browsing data, wherein the classifying includes classifying the current activity of the user as searching for a service provider;
in response to classifying the current activity of the user as searching for a service provider, performing web crawling on multiple websites to obtain research data, wherein the multiple websites are crawled by the performing web crawling in dependence on extracted data extracted by the examining the user browsing data; and
providing an action decision in dependence on the research data, wherein the action decision includes a decision to transmit a communication to the user on behalf of a certain service provider, wherein the examining the user browsing data includes extracting a product identifier of a product from webpage data browsed by the user, wherein the method includes determining a rate at which the user visits websites offering product items according to the product identifier, and presenting a price for the product to the user in dependence on the determined rate at which the user visits websites offering product items according to the identifier.

19. The system of claim 18, wherein the method includes iteratively performing the obtaining, the examining, and the classifying of the current activity of the user, and iteratively adjusting a browsing data transmission process by which the client computer device transmits the user browsing data for facilitation of the obtaining of the user browsing data, wherein the iteratively adjusting of the browsing data transmission process is in dependence on a current outcome of the classifying of the current activity of the user.

20. A computer program product comprising:
a computer readable storage medium readable by one or more processing circuit and storing instructions for execution by one or more processor for performing a method comprising:
obtaining user browsing data from a client computer device, the client computer device being associated to the user;
examining the user browsing data;
classifying a current activity of the user in dependence on the examining the user browsing data, wherein the classifying includes classifying the current activity of the user as searching for a service provider;
in response to classifying the current activity of the user as searching for a service provider, performing web crawling on multiple websites to obtain research data, wherein the multiple websites are crawled by the performing web crawling in dependence on extracted data extracted by the examining the user browsing data; and
providing an action decision in dependence on the research data, wherein the action decision includes a decision to transmit a communication to the user on behalf of a certain service provider, wherein the examining the user browsing data includes extracting a product identifier of a product from webpage data browsed by the user, wherein the method includes determining a rate at which the user visits websites offering product items according to the product identifier, and presenting a price for the product to the user in dependence on the determined rate at which the user visits websites offering product items according to the identifier.

* * * * *